(12) United States Patent
Ikeuchi et al.

(10) Patent No.: US 7,935,774 B2
(45) Date of Patent: May 3, 2011

(54) PARTICULATE WATER-ABSORBENT POLYMER AND PRODUCTION METHOD THEREOF

(75) Inventors: Hiroyuki Ikeuchi, Hyogo (JP); Makoto Nagasawa, Nara (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 12/501,734

(22) Filed: Jul. 13, 2009

(65) Prior Publication Data

US 2011/0046279 A9    Feb. 24, 2011

Related U.S. Application Data

(63) Continuation of application No. PCT/JP2008/050995, filed on Jan. 24, 2008.

(30) Foreign Application Priority Data

Jan. 24, 2007    (JP) ................. 2007-014288

(51) Int. Cl.
 *C08F 20/06* (2006.01)
(52) U.S. Cl. ............ 526/317.1; 526/219.6; 526/223; 525/340; 525/360
(58) Field of Classification Search ........... 526/219.6, 526/223, 317.1; 525/340, 360
See application file for complete search history.

(56) References Cited

U.S. PATENT DOCUMENTS

| | | | |
|---|---|---|---|
| 4,621,127 A | | 11/1986 | Denzinger et al. |
| 5,185,413 A | * | 2/1993 | Yoshinaga et al. ........ 526/233 |
| 6,313,231 B1 | | 11/2001 | Hosokawa et al. |
| 6,444,744 B1 | | 9/2002 | Fujimaru et al. |
| 2005/0013865 A1 | | 1/2005 | Nestler et al. |
| 2005/0085604 A1 | | 4/2005 | Handa et al. |
| 2006/0074160 A1 | | 4/2006 | Handa et al. |

FOREIGN PATENT DOCUMENTS

| | | | |
|---|---|---|---|
| EP | 0175317 | | 3/1986 |
| EP | 0781804 | | 7/1997 |
| JP | 01-275661 | | 11/1989 |
| JP | 02-117903 | | 5/1990 |
| JP | 04-331205 | | 11/1992 |
| JP | 05-086251 | * | 4/1993 |
| JP | 08-283318 | | 10/1996 |
| JP | 2000-327926 | * | 11/2000 |
| JP | 2003-052742 | | 2/2003 |
| JP | 2003-206381 | | 7/2003 |
| JP | 2005-186016 | | 7/2005 |
| WO | 00-55245 A1 | | 9/2000 |
| WO | 2006109882 | | 10/2006 |
| WO | 2008026772 | | 3/2008 |

OTHER PUBLICATIONS

Japanese Search Report mailed on April 15, 2008 corresponding to PCT Application No. PCT/JP2008/050995 filed on Jan. 24, 2008.
European Search Report For PCT/JP2008050995 Mailed Dec. 23, 2009.
European Office Action mailed Feb. 3, 2011, relating to EP Application No. 08703822.0.

* cited by examiner

*Primary Examiner* — Ling-Siu Choi
(74) *Attorney, Agent, or Firm* — Nixon & Vanderhye, PC

(57) ABSTRACT

An object of the present invention is to provide a method for producing a particulate water-absorbent polymer particle having remarkably improved long-term color stability, without an adverse effect (such as a delay in polymerization) on synthesis of the particulate water-absorbent polymer. The method includes the steps of polymerizing a monomer aqueous solution (B) containing (i) at least one type of monomer (A) that is capable of forming a particulate water-absorbent polymer by polymerization, (ii) at least one type of crosslinking agent, (iii) at least one type of polymerization initiator and (iv) an organophosphorus compound in an amount of not less than 1 but not more than 100 ppm by mass with respect to the monomer (A) so as to form a hydrogel polymer, and drying the hydrogel polymer. The method enables to provide an excellent particulate water-absorbent polymer that realizes (i) long-term color stability and improvement in urine tolerance and (ii) absorbing property, which are in such a trade-off relationship. In this way, the above object is attained.

24 Claims, 1 Drawing Sheet

F I G. 1
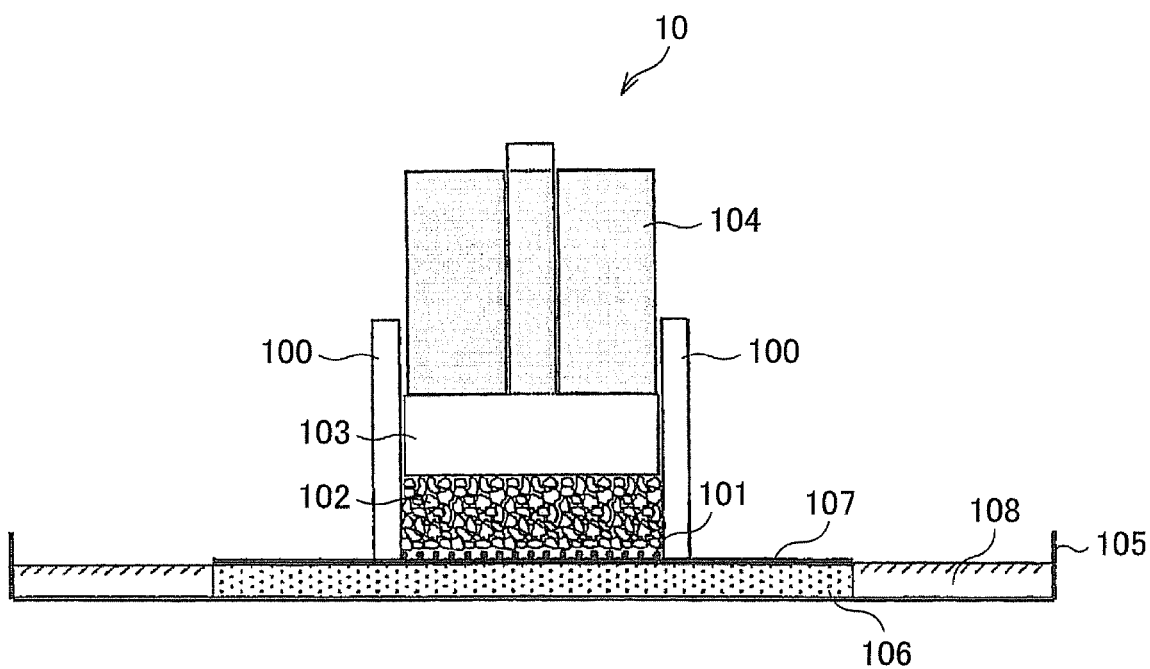

PARTICULATE WATER-ABSORBENT POLYMER AND PRODUCTION METHOD THEREOF

CROSS-REFERENCE TO RELATED APPLICATIONS

This application is a Continuation of PCT International Application Serial No. PCT/JP2008/050995 filed Jan. 24, 2008.

This application is based upon and claims the benefit of priority from prior Japanese Patent Application No. 2007-014288 filed Jan. 24, 2007.

TECHNICAL FIELD

The present invention relates to a particulate water-absorbent polymer having an excellent urine tolerance and long-term color stability, and a method for producing the particulate water-absorbent polymer.

More specifically, the present invention provides a method for producing a particulate water-absorbent polymer having a remarkably improved urine tolerance and remarkably improved long-term color stability without an adverse effect (such as a delay in polymerization) on synthesis of the water-absorbent polymer, by allowing a slight amount of organic phosphorous compound to coexist within a monomer aqueous solution.

The particulate water-absorbent polymer obtainable in the present invention, the particulate water-absorbent polymer having the improved urine tolerance and the long-term color stability, is suitable for use in a sanitary material such as a disposable diaper. The particulate water-absorbent polymer keeps its clean-imaged white condition even over long-term storage under a condition of high humidity and high temperature, when being used in the sanitary material such as the disposable diaper.

BACKGROUND ART

Recently, a water-absorbent polymer having an excellent absorption property has been developed and applied for various purposes. For example, the water-absorbent polymer has been used in a sanitary material such as a disposable diaper and a sanitary napkin; a pet sheet; a water stop material; or the like.

As a raw material of such a water-absorbent polymer, a variety of monomers and hydrophilic polymers are proposed. Among those, a polyacrylic (polyacrylate) water-absorbent polymer obtained by using acrylic acid and/or its salt as a monomer has been mostly produced and used in view of cost performance. For example, in a case of the sanitary material such as the disposable diaper and the sanitary napkin, a powdered water-absorbent polymer is mixed with white-colored pulp for use. In this case, in view of consumer acceptability, the water-absorbent polymer is required to be white for making a clean impression.

Generally, the water-absorbent polymer is in a form of white powder when it is shipped. However, the water-absorbent polymer is known to be colored (from white to yellow-brown) before it reaches consumers in a form of the disposable diaper or the like, for example if it is exposed under a condition of high humidity and high temperature for long periods of time. Therefore, it is desired to develop a water-absorbent polymer that excels in long-term color stability even over long-term exposure under the condition of high humidity and high temperature.

In order to prevent such a coloration, there have been known such methods as: a method of polymerizing an acrylic acid monomer and/or its salt with hydroxyperoxide and a reductant and then treating the resultant polymer with a silane coupling agent (Patent Literature 1); a method of adding an organophosphorus acid compound or its salt to a water-absorbent polymer after polymerization (Patent Literature 2); a method of controlling a total amount of hydroquinone and benzoquinone contained in acrylic acid to 0.2 ppm or less (Patent Literature 3); a method of adding an inorganic reductant to a water-absorbent polymer (Patent Literatures 4 and 5); a method of adding organic carboxylic acid or its salt to a water-absorbent polymer, and further adding an inorganic reducing agent or the like to the water-absorbent polymer (Patent Literatures 6 to 8); a production method in which polymerization is carried out with use of tocopherol as a polymerization inhibitor contained in acrylic acid (Patent Literature 9); and a production method in which a metal chelator is added in producing a water-absorbent polymer (Patent Literatures 10 and 11).

Among the metal chelators, a phosphorous chelator is used not only for preventing the coloration, but also is proposed to be used in other production methods, such as a production method of a water-absorbent polymer in which the phosphorous chelator is used as a polymerization stabilizer of a reversed phase suspension polymerization (Patent Literature 12) and a production method in which the phosphorous chelator is used as a gel stabilizer (Patent Literature 13).

However, none of the above-described methods could make a sufficient improvement in the coloration, and they rather have had such problems as a property deterioration, a cost increase, and depending on a compound to be used, a safety problem. Thus, (i) an absorbing property and a urine tolerance and (ii) the long-term color stability have conventionally been in such a trade-off relationship.

Further, in a case where the water-absorbent polymer is dried at a high temperature or surface-crosslinked at a high temperature (for example, 150° C. or more), the water-absorbent polymer is often colored or thermally deteriorated (for example, extractable content increases). Lowering a drying temperature or a temperature at which the surface crosslinkage is performed so as to avoid the above problems will be associated with a decrease in productivity.

CITATION LIST

Patent Literature 1

Japanese Patent Application Publication, Tokukaihei, No. 4-331205 A

Patent Literature 2

Japanese Patent Application Publication, Tokukaihei, No. 5-86251 A

Patent Literature 3

U.S. Pat. No. 6,444,744

Patent Literature 4

Pamphlet of International Publication WO2000/55245

Patent Literature 5

United States Patent Application Publication No. 2006-0074160

Patent Literature 6

Japanese Patent Application Publication, Tokukai, 2000-327926 A

Patent Literature 7

Japanese Patent Application Publication, Tokukai, 2003-52742 A

Patent Literature 8

Japanese Patent Application Publication, Tokukai, 2005-186016 A

Patent Literature 9

Pamphlet of International Publication WO2003/53482

Patent Literature 10

United States Patent Application Publication No. 2005-0085604

Patent Literature 11

Japanese Patent Application Publication, Tokukai, No. 2003-206381 A

Patent Literature 12

Japanese Patent Application Publication, Tokukaihei, No. 2-117903 A

Patent Literature 13

Japanese Patent Application Publication, Tokukaihei, 1-275661 A

SUMMARY OF INVENTION

An object of the present invention is to provide (i) a safe water-absorbent polymer being produced at low cost and having excellent long-term color stability and (ii) a method of producing water-absorbent polymer particles having the long-term color stability.

Another object of the present invention is to provide a method for efficiently producing a water-absorbent polymer having excellent physical properties while preventing the water-absorbent polymer from deteriorating or being colored by drying at a high temperature or surface-crosslinking at a high temperature.

The inventors of the present invention diligently worked in order to attain the object. As a result, the inventors of the present invention found that a water-absorbent particle having the improved urine tolerance and remarkably improved long-term color stability is obtained at low cost without deterioration during polymerization, by allowing in advance an organic phosphorous compound to coexist in a monomer aqueous solution that is capable of forming the water-absorbent polymer by polymerization, polymerizing the monomer aqueous solution so as to obtain a hydrogel polymer, and then drying the obtained hydrogel polymer. Based on the finding, the inventors of the present invention have accomplished the present invention.

The present invention particularly relates to a water-absorbent polymer particle that excels in prevention of gel deterioration, improvement in the urine tolerance, and the long-term color stability. Further, the present invention provides a method of using the organic phosphorous compound in a polymer for preventing the water-absorbent polymer from deteriorating by heat during a production process.

Specifically, the object of the present invention is attained by means as set forth below.

(1) A method for producing a particulate water-absorbent polymer, the method including: polymerizing a monomer aqueous solution (B) containing (i) at least one type of monomer (A) that is capable of forming a water-absorbent polymer by polymerization, (ii) at least one type of crosslinking agent, (iii) at least one type of polymerization initiator and (iv) an organic phosphorous compound in an amount of not less than 1 ppm by mass but not more than 100 ppm by mass with respect to the monomer (A) so as to obtain a hydrogel polymer; and drying the hydrogel polymer.

(2) A method for producing a particulate water-absorbent polymer, the method including: polymerizing a monomer aqueous solution (B) containing (i) at least one type of monomer (A) that is capable of forming a water-absorbent polymer by polymerization, (ii) at least one type of crosslinking agent and (iii) at least one type of polymerization initiator so as to obtain a hydrogel polymer; and thermally drying the hydrogel polymer, wherein the hydrogel polymer before the drying contains an organic phosphorous compound, and a drying temperature during the step of thermally drying is not less than 150° C. but not more than 250° C.

Since the methods (1) and (2) of producing the particulate water-absorbent polymer employ the organic phosphorous compound in the production process, it is possible to achieve extremely favorable effects such that the obtained water-absorbent polymer excels both in (i) the long-term color stability and the urine tolerance and (ii) an absorbing property, and that it is possible to prevent the water-absorbent polymer from deteriorating due to breakage of main-chain caused by the thermally drying.

(3) The method according to (1) or (2), wherein the monomer aqueous solution (B) contains the organic phosphorous compound in an amount of not less than 30 ppm by mass but not more than 100 ppm by mass with respect to the monomer (A).

(4) The method according to any one of (1) to (3), wherein the at least one type of monomer (A) that is capable of forming a particulate water-absorbent polymer by polymerization contains not less than 70 mol % but not more than 100 mol % of acrylic acid and salt thereof, and the acrylic acid and salt thereof contain not less than 1 mol % but not more than 50 mol % of acrylic acid and not less than 50 mol % but not more than 99 mol % of an alkali metal salt of acrylic acid.

(5) The method according to any one of (1) to (4), wherein the monomer aqueous solution (B) contains iron in an amount of not less than 0.001 ppm by mass but not more than 5 ppm by mass (based on $Fe_2O_3$) with respect to the monomer (A).

(6) The method according to any one of (1) to (5), further including surface-crosslinking the particulate water-absorbent polymer.

(7) The method according to any one of (1) to (6), wherein the step of surface-crosslinking includes heating the particulate water-absorbent polymer at a heating temperature of not less than 150° C. but not more than 250° C.

(8) The method according to any one of (1) to (7), further including adding the organic phosphorous compound to the hydrogel polymer after the polymerization or to the water-absorbent polymer after the drying.

(9) The method according to any one of (1) to (8), wherein moisture content of the particulate water-absorbent polymer is not more than 5 mass %.

(10) The method according to any one of (1) to (9), wherein the hydrogel polymer is thermally dried at a heating temperature of not less than 170° C. but not more than 220° C.

(11) The particulate water-absorbent polymer according to any one of (1) to (10), wherein the particulate water-absorbent polymer after 7-day exposure to atmosphere of 70±1° C. of temperature and 65±1% of relative humidity exhibits an L value (Lightness) of 70 or higher in Hunter's Lab color system.

(12) A particulate water-absorbent polymer containing an organic phosphorous compound in an amount of not less than 30 ppm by mass but not more than 500 ppm by mass with respect to the particulate water-absorbent polymer, the particulate water-absorbent polymer satisfying at least one of the followings (a) to (c):

(a) a particle of the particulate water-absorbent polymer after 7-day exposure to atmosphere of 70±1° C. of temperature and 65±1% of relative humidity exhibits an L value (Lightness) of 70 or higher in Hunter's Lab color system;

(b) the particulate water-absorbent polymer contains particles having a diameter of less than 150 μm in an amount of 0 or more mass % but not more than 5 mass %; a mass median particle size (D50) is not less than 200 μm but not more than 600 μm; and a logarithmic standard deviation ($\sigma\zeta$) of a particle size distribution is not less than 0.20 but not more than 0.40; and (c) an absorbency against pressure (AAP) under pressure of 1.9 kPa or 4.8 kPa for 0.90 mass % sodium chloride aqueous solution for 60 minutes is at least 20 (g/g).

(13) The particulate water-absorbent polymer according to (12), further containing iron in amount of not less than 0.001 ppm by mass but not more than 5 ppm by mass (based on $Fe_2O_3$) with respect to the particulate water-absorbent polymer.

Since the method of the present invention employs a special way of adding a characteristic additive, it is possible to minimize a using amount of an additive (organic phosphorous compound) having no positive effect on an absorbing ability. Accordingly, it is possible to provide a method for obtaining a safe water-absorbent polymer having the improved urine tolerance and the remarkably improved long-term color stability at low cost without an adverse effect and a loss of water absorbing characteristics during polymerization.

Further, the method of the present invention provides a particulate water-absorbent polymer that excels both in (i) the long-term color stability and the urine tolerance and (ii) the absorption property, which are in such a trade-off relationship. In addition, the method of the present invention makes it possible to prevent deterioration of a polymer and increase in extractable content, which are caused by breakage of polymer main-chain due to heat history during processes (e.g., drying process and surface-crosslinking process) of producing the water-absorbent polymer. Thus provided is a method for producing a water-absorbent polymer having excellent physical properties in a productive way, without deterioration and coloration due to drying at a high temperature or surface-crosslinking at a high temperature.

Furthermore, the water-absorbent polymer with long-term color stability that is obtained in the present invention can be suitably used in a sanitary material such as a disposable diaper, and keeps its clean-imaged white condition even over long-term storage under a condition of high temperature and high humidity. For example, in a case where a particle of the water-absorbent polymer is exposed to an atmosphere of 70±1° C. of temperature and 65±1% of relative humidity for seven days, the particle keeps its clean-imaged white condition (an L value (Lightness) in Hunter's Lab color system is 70 or higher).

BRIEF DESCRIPTION OF DRAWINGS

FIG. 1 is a cross-sectional view schematically illustrating a device for measuring an absorbency against pressure (AAP).

EXPLANATION OF REFERENTIAL NUMERALS

102 Particulate Water Absorbent

DESCRIPTION OF EMBODIMENTS

A particulate water-absorbent polymer according to the present invention and a method for producing the water-absorbent polymer are described as follows. Note that the particulate water-absorbent polymer may be referred to as a water-absorbent polymer particle, or may be referred to merely as a water-absorbent polymer. Also, unless otherwise stated, a range of not less than A but not more than B may be described as A to B. Further, parts by mass is equivalent to weight by mass, mass % is equivalent to wt %, and ppm by mass is equivalent to ppm by weight.

(1) Monomer (A)

A monomer (A) that is capable of forming a water-absorbent polymer by polymerization that can be used in the present invention may be selected from, for example, all the monomers disclosed in the foregoing patents or patents described later. Examples of the monomer (A) encompass: an unsaturated monomer containing an acid group such as acrylic acid, methacrylic acid, maleic acid (anhydride), fumaric acid, crotonic acid, itaconic acid, vinyl sulphonic acid, 2-(meth)acrylamide-2-methylpropanesulphonic acid, (meth)acryloxyalkane sulphonic acid; hydrophilic monomers such as N-vinyl-2-pyrolidone, N-vinylacetamide, (meth)acrylamide, N-isopropyl(meth)acrylamide, N,N-dimethyl(meth)acrylamide, 2-hydroxyethyl(meth)acrylate, methoxypolyethylene glycol(meth)acrylate, polyethylene glycol(meth)acrylate; and salts thereof.

The monomer is preferably an unsaturated monomer containing an acid group, particularly preferably acrylic acid and/or its salt. Most preferably used as a repeating unit of the polymer are acrylic acid and its salt including 1 to 50 mol %, more preferably 1 to 40 mol % of acrylic acid and 50 to 99 mol %, more preferably 60 to 99 mol % of alkali metal salt of acrylic acid. That is, a neutralization ratio of the acrylic acid serving as the repeating unit of the polymer is 50 to 99 mol %, and preferably 60 to 99 mol %. Neutralization may be carried out either by neutralizing the monomer before polymerization or by neutralizing the polymer during or after the polymerization. Alternatively, the neutralization may be carried out in a combination of these neutralization methods. Preferable example of the acrylic acid salt is alkali metal salt such as sodium salt and potassium salt.

In the present invention, a total amount of the acrylic acid and/or its salt used as the monomer (A) is preferably 10 to 100 mol %, more preferably 70 to 100 mol %, particularly preferably 90 to 100 mol % with respect to a whole monomer amount (excluding a crosslinking agent). If necessary, a monomer other than the crosslinking agent may also be added in amount of 0 to 30 mol %, more preferably 0 to 10 mol % (including or excluding 10 mol %).

The acrylic acid preferably contains a specified amount of polymerization inhibitor, which may preferably be a methoxyphenol, and more preferably be p-methoxyphenol. The methoxyphenol is contained in an amount of 10 to 200 ppm by mass, preferably 10 to 90 ppm by mass, and particularly preferably 20 to 90 ppm by mass, with respect to the acrylic acid.

The acrylic acid of the present invention contains impurities such as protoanemonin and/or furfural in an amount as small as possible. The amount of the protoanemonin and/or furfural contained in the acrylic acid is 0 to 20 ppm by mass, more preferably 0 to 10 ppm by mass, further preferably 0 to 5 ppm by mass, further more preferably 0 to 2 ppm by mass, and particularly preferably 0 to 1 ppm by mass.

(2) Crosslinking Agent

The crosslinking agent that can be used in the present invention is one or a combination of the following compounds listed herein as examples: compounds containing at least two polymerizable double bonds per molecule, such as N,N'-methylenebisacrylamide, (poly)ethylene glycol di(meth)acrylate, (poly)propylene glycoldi(meth)acrylate, (polyoxyethylene) trimethylolpropanetri(meth)acrylate, trimethylolpropane di(meth)acrylate, polyethylene glycoldi(β-acryloyloxypropionate), trimethylolpropanetri(β-acryloyloxypropionate), and poly(meth)aryloxyalkanes; and a compound that can react with a carboxyl group to form a covalent bond, such as polyglycidylether (such as ethylene glycol diglycidylether), and polyol (such as ethylene glycol, polyethylene glycol, glycerine, and sorbitol).

In a case where one or more types of the above crosslinking agents are used, it is preferable that the compound having at least two polymerizable double bonds per molecule be essentially included, taking into consideration an absorbing property or the like of the resultant water-absorbent polymer. In view of physical properties, the crosslinking agent is added in an amount of 0.0001 to 5 mol %, preferably 0.005 to 2 mol %, and further preferably 0.008 to 1 mol %, with respect to the monomer (A) that is capable of forming a water-absorbent polymer.

(3) Polymerization Initiator

A polymerization initiator used in the present invention is selected as needed according to how the polymerization is carried out. Examples of such polymerization initiator encompass: a photodegradable type polymerization initiator, a thermally-degradable type polymerization initiator, and a redox polymerization initiator.

Examples of the photodegradable type polymerization initiator encompass: a benzoin derivative, a benzyl derivative, an acetophenone derivative, a benzophenone derivative, and an azo compound.

Examples of the thermally-degradable type polymerization initiator encompass: persulfate such as sodium persulfate, potassium persulfate, ammonium persulfate; peroxide such as hydrogen peroxide, t-butylperoxide, methyl ethyl ketone peroxide; an azo compound such as an azo nitrile compound, an azo amidine compound such as an cyclic azo amidine compound, an azo amide compound, an alkyl azo compound, 2,2'-azobis(2-amidinopropane)dihydrochloride, and 2,2'-azobis[2-(2-imidazoline-2-yl) propane]dihydrochloride.

An example of the redox polymerization initiator is a system including a combination of (i) the persulfate or peroxide and (ii) a reducing compound such as L-ascorbic acid and acid sodium sulfite. In the present invention, it is also a preferable embodiment that the photodegradable type polymerization initiator is used together with the thermally-degradable type polymerization initiator.

An amount of the polymerization initiator used in the present invention is 0.0001 to 1 mol %, preferably 0.001 to 0.5 mol %, with respect to the monomer (A).

(A) Organic Phosphorous Compound

An organic phosphorous compound used in the present invention is preferably an organic amino phosphoric acid having an amino group. Such an organic amino phosphoric acid may be a water-soluble organic amino phosphoric acid, and preferably a water-soluble non-polymeric organic amino phosphoric acid. The number of amino groups contained in one molecule of the organic amino phosphoric acid is preferably 1 or more, more preferably 2 or more, whereas the number of phosphate groups contained is preferably 1 or more, more preferably 2 or more, particularly preferably 3 or more. Generally, an upper limit of each of the number of amino groups and the number of phosphate groups contained is 100 or less, preferably 10 or less, particularly preferably 5 or less. It should be noted that in this description, "water-soluble" indicates that a compound is soluble in 100 g of water at 25° C. by 0.1 g or more, preferably 1 g or more, and particularly preferably 5 g or more. Further, a molecular weight thereof is generally 50 to 5000, preferably 100 to 1000, more preferably 200 to 500.

Examples of the organic phosphorous compound to be used encompass: ethylenediamine-N,N'-di(methylenephosphinic acid), ethylenediaminetetra(methylenephosphinic acid), nitriloacetic-di(methylenephosphinic acid), nitrilodiacetic-(methylenephosphinic acid), nitriloacetic-β-propionic acid-methylenephosphonic acid, nitrilotris(methylenephosphonic acid), cyclohexanediaminetetra(methylenephosphonic acid), ethylenediamine-N,N'-diacetic acid-N,N'-di(methylenephosphonic acid), ethylenediamine-N,N'-di (methylenephosphonic acid), ethylenediaminetetra (methylenephosphonic acid), polymethylene diaminetetra (methylenephosphonic acid), diethylenetriaminepenta (methylenephosphonic acid), 1-hydroxyethylidenediphosphonic acid, and salts thereof. The most preferred organic phosphorous compound in the present invention is the ethylenediaminetetra(methylenephosphonic acid) or its salt. Preferred as salts are alkali metal salts such as sodium salt and potassium salt; ammonium salt; amine salt; or the like. Particularly preferred as salts are sodium salt and potassium salt.

Prior to the polymerization, the organic phosphorous compound used in the present invention should be added, for the polymerization, with at least one type of monomer (A) that is capable of forming a water-absorbent polymer by polymerization. This provides the effect attained by the present invention. In order to preferably achieve the effect of the present invention, the organic phosphorous compound is contained in an amount of preferably 1 to 100 ppm by mass, more preferably 30 to 100 ppm by mass, and further preferably 50 to 100 ppm by mass. The monomer (A) is contained in a monomer aqueous solution (B).

If the amount of the phosphorous compound is less than 1 ppm by mass, a urine tolerance may be reduced and long-term color stability may become less effective. On the other hand, if the amount of the phosphorous compound is more than 100 ppm by mass, the polymerization may be inhibited or may become more difficult to be controlled (e.g., polymerization may suddenly occur) and thereby causes instability of physical properties of the resultant water-absorbent polymer. Therefore, the amount of the phosphorous compound more than 100 ppm by mass is not preferable as well. Since the organic phosphorous compound is contained in the monomer aqueous solution (B) in advance, the polymerization can be easily controlled. This makes it possible to obtain a safe particulate water-absorbent polymer that excels in the long-term color stability at low cost only with a slight amount of addition of the organic phosphorous compound. Furthermore, polymer chain deterioration due to heat history during a production process such as a later-described drying process can be prevented. This makes it possible to obtain a water-absorbent polymer having excellent characteristics.

In a case where a predetermined amount of organic phosphorous compound is added to the monomer (A), the organic phosphorous compound may be added in advance at a stage of preparing the monomer (A) or the monomer aqueous solution (B), before or after a polymerization initiator is added to the monomer aqueous solution (B), or during the polymerization. The organic phosphorous compound is added when a polymerization ratio is preferably less than 80%, more preferably less than 50%.

The water-absorbent polymer may be prepared in such a manner that the organic phosphorous compound is further added after the monomer (A) containing the predetermined amount of organic phosphorous compound is polymerized, for adjusting physical properties of the water-absorbent polymer or for other purposes.

The organic phosphorous compound may either be added to the monomer (A) before or after the polymerization. That is, after the polymerization, for example, the organic phosphorous compound may be added to a hydrogel polymer, to a dried polymer after a drying process, or may be added in a surface-crosslinking process. These post-polymerization processes are described later.

In a case where the organic phosphorous compound is added in the post-process after the polymerization, a total amount of the organic phosphorous compounds with respect to the water-absorbent polymer particle is less than 1000 ppm by mass, preferably not more than 500 ppm by mass, more preferably 30 to 500 mass ppn, particularly preferably 50 to 500 ppm by mass, and most preferably 50 to 300 ppm by mass.

The total amount of the organic phosphorous compounds exceeding 1000 ppm by mass with respect to the water-absorbent polymer particle is not preferable, because if so, surface tension of liquid such as body fluid (e.g., blood and urine) and waste fluid absorbed into the water-absorbent polymer becomes low. In the case where the surface tension of the liquid (absorbed liquid) is low, if for example a pressure such as body weight is applied on an absorbing article such as a disposable diaper, urine may be squeezed out, thereby failing to keep urine inside the absorbing article.

(5) Hydroxycarboxylic Acid

A hydroxycarboxylic acid compound that can be used in the present invention is carboxylic acid or its salt, which has a hydroxyl group within its molecule. Examples of such hydroxycarboxylic acid compound encompass: lactic acid, glycolic acid, malic acid, glyceric acid, tartaric acid, citric acid, isocitric acid, salicylic acid, mandelic acid, gallic acid, mevalonic acid, chinic acid, shikimic acid, beta-hydroxypropionic acid, and salts thereof. Among these, alpha-hydroxycarboxylic acids are more preferably used in the present invention.

The alpha-hydroxycarboxylic acids are carboxylic acids having a hydroxyl group bound to an alpha carbon in their molecules. Preferred among those are non-polymeric alpha-hydroxycarboxylic acids. In view of ease and effect of addition, the non-polymeric alpha-hydroxycarboxylic acids have a molecular weight of preferably 40 to 2000, more preferably 60 to 1000, and particularly preferably 100 to 500. The non-polymeric alpha-hydroxycarboxylic acids are preferably soluble in water. Examples of such alpha-hydroxycarboxylic acids encompass: lactic acid and salt thereof, citric acid and salt thereof, malic acid and salt thereof, isocitric acid and salt thereof, glyceric acid and salt thereof, and poly alpha-hydroxy acrylic acid and salt thereof.

By adding the hydroxycarboxylic acid compound (preferably an alpha-hydroxycarboxylic acid) into a monomer aqueous solution (B) so as to use the hydroxycarboxylic acid compound together with an organic phosphorous compound, it is possible to further improve long-term color stability.

In view of the long-term color stability, it is most preferable that the hydroxycarboxylic acid compound be added to the monomer aqueous solution (B) in advance. However, it is also possible to add the hydroxycarboxylic acid compound at any stage of the production process of the water-absorbent polymer, as long as the hydroxycarboxylic acid compound is effective. The hydroxycarboxylic acid compound may be added at any stage of the production process of the water-absorbent polymer, such as during polymerization, after the polymerization, when the water-absorbent polymer is dried, when the water-absorbent polymer is pulverized, before the surface-crosslinking, during the surface-crosslinking, and after the surface-crosslinking. As described later, the hydroxycarboxylic acid compound may also be added when a hydrogel polymer is chipped.

In view of cost performance, a using amount of such hydroxycarboxylic acid compounds is preferably 1 to 10000 ppm by mass with respect to the monomer (A), or 1 to 10000 ppm by mass with respect to solid content of the water-absorbent polymer.

(6) Polymerization Process of Monomer

The advantageous water-absorbent polymer obtainable in the present invention is polyacrylate. For example, the water-absorbent polymer is alkali metal salt of polyacrylic acid. Alkali metal salt of polyacrylic acid is obtainable by polymerizing a monomer mixture containing: a monomer (A) containing 1 to 50 mol % of acrylic acid, 50 to 99 mol % of acrylic acid alkali metal salt, and 0.005 to 2 mol % of crosslinking agent; 0.005 to 2 mol % of crosslinking agent; and 1 to 100 ppm by mass, more preferably 30 to 100 ppm by mass, and further preferably 50 to 100 ppm by mass, with respect to the monomer (A), of an organic phosphorous compound.

At this point, an acrylic acid monomer aqueous solution is neutralized prior to the polymerization. In another advantageous embodiment, the acrylic acid is polymerized in the presence of the organic phosphorous compound in an amount of 1 to 100 ppm by mass with respect to the acrylic acid, and thereafter a hydrogel thus obtained is neutralized with alkali metal salt, i.e., post-polymerization neutralization of the hydrogel is performed, thereby obtaining the polyacrylate alkali metal salt.

In the present invention, a monomer aqueous solution (B) is prepared by mixing the monomer (A), an internal surface-crosslinking agent, and water with one another in amounts within the ranges defined above. The monomer aqueous solution (B) further contains the organic phosphorous compound in an amount within the ranges defined above at a timing described above.

A monomer concentration of the monomer aqueous solution (B) is 20 to 80 mass %, preferably 35 to 80 mass %, and further preferably 40 to 70 mass %. The monomer aqueous solution (B) may also be in a form of slurry, in which some solids are precipitated out.

Further, a solvent other than the water may also be used together if needed. The solvent used together with the water is not limited to a particular kind. Also, a monomer compound or a crosslinking agent compound may be used in the monomer (A) as needed. For example, (i) approximately 0 to 30 mass % of polymers such as a water-soluble polymer and a water-absorbent polymer and (ii) approximately 0 to 1 wt % of chain transfer agent or the like may be added.

The monomer aqueous solution (B) contains a slight amount of iron for the sake of better polymerization control. An amount of the iron is preferably 0.001 to 5 ppm by mass, and particularly preferably 0.001 to 3 ppm by mass based on $Fe_2O_3$. If the amount of iron is out of the ranges described above, the polymerization becomes hard to be controlled due to a polymerization delay or bumping.

An example of a method for controlling the amount of iron contained in the monomer aqueous solution (A) is an addition of a water-soluble iron compound. For example, in a case where acrylic acid is used as the monomer, the acrylic acid may be neutralized within the ranges described above, with use of alkali metal salt (such as sodium hydrate, potassium hydrate, sodium carbonate, and sodium acid carbonate) containing a slight amount of iron.

A preferred condition or the like under which the neutralization is carried out are exemplified in Pamphlet of International Publication WO2006/522181, and are applied to the present invention.

Generally, it is preferable that the polymerization be carried out by aqueous polymerization or reversed phase suspension polymerization in view of better performance and ease of the polymerization control. Such polymerization may be carried out under air atmosphere; however, it is preferable that the polymerization be carried out under inert gaseous atmosphere (for example, an amount of oxygen is not more than 1%) using an inner gas of nitrogen, argon, or the like. It is also preferable that dissolved oxygen be sufficiently replaced with the inert gas (for example, an amount of the oxygen is less than 1 ppm) before the polymerization of the monomeric component (monomer).

The reversed phase suspension polymerization is a polymerization method in which a monomer aqueous solution is suspended in a hydrophobic organic solvent. For example, the reversed phase suspension polymerization is disclosed in U.S. Pat. No. 4,093,776, No. 4,367,323, No. 4,446,261, No. 4,683,274, No. 4,880,886, No. 5,180,798, No. 5,210,159, No. 5,202,400, No. 5,244,735, No. 5,397,845, No. 5,408,006, No. 5,412,0237, No. 5,563,218, No. 5,807,916, No. 5,885,462, No. 5,998,553, United States Patent Application Publication No. 2007-015887, and the like.

The aqueous polymerization is a method in which the monomer aqueous solution is polymerized without a dispersion solvent. For example, the aqueous polymerization is disclosed in U.S. Pat. No. 4,625,001, No. 4,873,299, No. 4,286,082, No. 4,973,632, No. 4,985,518, No. 5,124,416, No. 5,250,640, No. 5,264,495, No. 5,145,906, No. 5,380,808, No. 4,769,427, No. 4,873,299, No. 6,455,600, No. 6,602,950, No. 6,710,141, and the like, and European Patents No. 0811636, No. 0955086, No. 0922717, No. 1178059, and the like. In performing the polymerization in the present invention, it is also possible to use monomers, crosslinking agents, polymerization initiators, and other additives disclosed in the above-described Patent Literatures.

In view of physical properties, a polymerization method used in the present invention is preferably the aqueous polymerization or the reversed phase suspension polymerization, particularly preferably the aqueous polymerization, and further preferably an aqueous polymerization using belt polymerization (for example, U.S. Pat. No. 4,857,610, No. 4,893, 999, No. 6,174,978, and No. 6,911,499, and United States Patent Application Publications No. 2005-0215734 and No. 2006-0167198) or kneader polymerization (For example, U.S. Pat. No. 6,710,141, No. 6,987,151, and No. 5,124,416), particularly preferably a continuous aqueous polymerization. Preferred examples of a polymerization temperature and a polymerization concentration are exemplified in U.S. Pat. No. 6,906,159 and No. 7,091,253.

Among the polymerization methods described above, the reversed phase suspension polymerization is not environmentally-friendly since a large amount of organic solvent is used. Further, a surfactant used in the reversed phase suspension polymerization may reduce surface tension. In view of these, the aqueous polymerization is particularly preferable in the present invention.

A hydrogel polymer obtained by the polymerization will become a dried particle or the water-absorbent polymer of the present invention through a subsequent process of drying.

(7) Process of Crushing Hydrogel Polymer

The hydrogel polymer obtained may be dried as it is; however, if necessary, the hydrogel polymer is chipped by use of a gel crusher or the like before being dried. The water-absorbent polymer with long-term color stability of the present invention (the water-absorbent polymer having long-term color stability) is not limited to be in a particular shape, and may be in any shape such as granules, powder, flakes, fibers, or the like. Therefore, the polymer is chipped by a variety of methods. One example is a method of crushing the polymer by chipping the polymer extruded from a screw extruder with a porous die having pores of any shape. In performing extrusion crushing, the aforementioned organic phosphorous compound, the hydroxycarboxylic acid compound, or the salts thereof in a form of aqueous solution may be added, so that a urine tolerance can be improved and color degradation can be further prevented.

(8) Drying Process

A drying temperature suitable in the present invention is not particularly limited. However, a drying process is performed for example at a temperature within a range of 50 to 300° C. (preferably performed under reduced pressure in a case of 100° C. or lower), second preferably 100 to 250° C., more preferably 150 to 250° C., further preferably 160 to 250° C., particularly preferably 170 to 250° C., and most preferably 170 to 220° C. A drying period is preferably approximately 1 to 120 minutes, further preferably 10 to 60 minutes, and particularly preferably 20 to 50 minutes. The present invention realizes excellent physical properties and low coloration degree even with thermal drying at a high temperature.

In a case of aqueous polymerization which is particularly preferable in the present invention, the drying is carried out at a temperature within a range of preferably 100 to 250° C., more preferably 150 to 250° C., further preferably 160 to 250° C., particularly preferably 170 to 250° C., and most preferably 170 to 220° C. The drying is carried out particularly preferably with hot air.

A second production method according to the present invention is a method including: polymerizing a monomer aqueous solution (B) containing (i) at least one type of monomer (A) that is capable of forming a water-absorbent polymer by polymerization, (ii) at least one type of crosslinking agent and (iii) at least one type of polymerization initiator so as to obtain a hydrogel polymer; and thermally drying the hydrogel polymer, wherein the hydrogel polymer before drying contains an organic phosphorous compound, and the heated-air drying is performed at a temperature within a range of 150 to 250° C. In this method, the organic phosphorous compound may be added during or after the polymerization of the monomer aqueous solution (B).

In the present invention, use of the organic phosphorous compound makes it possible to prevent a drying deterioration (e.g., breakage of polymer main chain due to the drying) even at a drying temperature of as high as 100° C. or more, particularly 150 to 250° C. This makes it possible to improve productivity, for example to shorten a drying period.

Examples of the applicable drying method encompass a variety of methods such as thermal drying, hot-air drying, reduced-pressure drying, fluidized-bed drying, infrared ray drying, microwave drying, drum dryer drying, dehydration by azeotropy with a hydrophobic organic solvent, and high-humidity drying with high-temperature steam. Preferred among those is, for example, drying by contacting the hydrogel polymer with gas whose dew-point temperature is 40 to 100° C., more preferably 50 to 90° C.

The particulate water-absorbent polymer of the present invention is adjusted to have moisture content described later, through the above drying process.

(9) Pulverization, Classification, and Granulation Processes

Dried particles or the water-absorbent polymer particles of the present invention obtained by the drying may be subjected to a process of pulverization, classification, granulation, or the like, if needed, depending on its purpose. Methods of the pulverization, classification, granulation, or the like are described in, for example, Pamphlet of International Publication WO2004/69915.

(10) Surface-crosslinking Treatment Process

The dried particles and the water-absorbent polymer particles of the present invention can be turned into a water-absorbent polymer with long-term color stability that is more suitable for a sanitary material, through a conventionally known surface-crosslinking process. The surface-crosslinking is such that a surface layer (shallow surface: generally, an area that is at a distance of approximately several tens of μm (including 10 μm) from the surface layer of the water-absorbent polymer) of the water-absorbent polymer is treated so that a crosslink density on a part of the surface layer becomes higher. This can be accomplished by radical crosslinking on the surface, surface polymerization, crosslinking reaction with the surface-crosslinking agent, or the like.

The surface-crosslinking treatment with use of a surface-crosslinking agent more suitably applied in the present invention is further described as follows.

Examples of the surface-crosslinking agent that can be used in the present invention encompass a variety of organic or inorganic crosslinking agents. However, in view of physical properties and handlability, a crosslinking agent that is reactable with a carboxyl group is preferably used. Examples of such a crosslinking agent encompass: a polyalcohol compound; an epoxy compound; a polyamine compound and a condensate of the polyamine compound and a haloepoxy compound; a oxazoline compound; mono-, di-, and poly-oxazolidinone compounds; polyvalent metal salt; and a alkylene carbonate compound.

More specifically, examples of such a crosslinking agent encompass compounds disclosed in U.S. Pat. No. 6,228,930, No. 6,071,976, No. 6,254,990, and the like. Such a crosslinking agent may be, but not limited to, a polyalcohol compound such as mono-, di-, tri-, tetra-, and polyethylene glycol, monopropylene glycol, 1,3-propanediol, dipropylene glycol, 2,3,4-trimethyl-1,3-pentanediol, polypropylene glycol, glycerin, polyglycerol, 2-butene-1,4-diol, 1,4-butanediol, 1,3-butanediol, 1,5-pentanediol, 1,6-hexanediol, or 1,2-cyclohexandimethanol; an epoxy compound such as ethylene glycol diglycidyl ether or glycidol; a polyamine compound such as ethylenediamine, diethylene triamine, triethylenetetramine, tetraethylenepentamine, pentaethylenehexamine, polyethylenimine, or polyamide polyamine; a haloepoxy compound such as epichlorohydrin, epibromohydrin, or alpha-methyl-epichlorohydrin; a condensate of the polyamine compound and the haloepoxy compound; an oxazolidinone compound such as 2-oxazolidinone; an alkylene carbonate compound such as ethylene carbonate; an oxetane compound; and a cyclic urea compound such as 2-imidazolidinone.

A dehydration reaction crosslinking agent (a crosslinking agent which causes dehydration reaction between a carboxyl group of water-absorbent resin and a functional group of the crosslinking agent) can attain the effect of the present invention remarkably. For example, the polyalcohol compound, the oxazolidinone compound, and the alkylenecarbonate compound can be used. Especially the polyalcohol compound can be used.

A using amount of the surface-crosslinking agent is, although depending on compounds to be used and a combination thereof, preferably 0.001 parts by mass to 10 parts by mass, and more preferably 0.01 parts by mass to 5 parts by mass, with respect to 100 parts by mass of the water-absorbent polymer particles.

In the present invention, water may be used together with the surface-crosslinking agent. In this case, a using amount of the water is preferably 0.5 to 20 parts by mass, and more preferably 0.5 to 10 parts by mass, with respect to 100 parts by mass of the water-absorbent polymer particles. Further, in the present invention, not only the water but also a hydrophilic organic solvent is usable. In this case, a using amount of the hydrophilic organic solvent is 0 to 10 parts by mass, and preferably 0 to 5 parts by mass, with respect to 100 parts by mass of the water-absorbent polymer particles. In mixing a crosslinking agent solution into the water-absorbent polymer particles, water-insoluble fine particles powder and/or a surfactant may be added together, provided that they do not hinder the effect of the present invention. A total amount of the water-insoluble fine particles powder and the surfactant to be added is 0 to 10 mass %, preferably 0 to 5 mass %, and further preferably 0 to 1 mass %. Examples of the surfactant to be used and a using amount thereof are exemplified in International Application No. WO2005JP1689 (International Filing Date: Feb. 2, 2005).

A mixing device for mixing the crosslinking solution may be selected from a variety of mixing apparatuses. For example, a high-speed stirring mixer is used, and particularly preferably a high-speed stirring continuous mixer is used. Examples of such mixers are Turbulizer (Hosokawa Micron Corporation, Japan) and Loedige mixer (Gebruder Loedige Maschinenbau GmbH, Germany).

The water-absorbent polymer particles into which the surface-crosslinking agent has been mixed are preferably heated for facilitating the crosslinking reaction. The heat treatment heats water-absorbent polymer particles at a temperature of preferably 100 to 250° C., more preferably 150 to 250° C., particularly preferably 160 to 250° C., and most preferably 170 to 250° C., for example for 1 to 180 minutes, further preferably for 5 to 60 minutes.

The method of the present invention of producing the particulate water-absorbent polymer containing an organic phosphorous compound makes it possible to provide a particulate water-absorbent polymer that can prevent polymer from thermal deteriorating due to heating at a temperature within the same range as that of the drying process.

Such surface-crosslinking methods are described in Patent Literatures such as European Patents No. 0349240, No. 0605150, No. 0450923, No. 0812873, No. 0450924, and No. 0668080; Japanese Patent Application Publications, Tokukaihei, No. 7-242709 and No. 7-224304; U.S. Pat. No. 5,409,771, No. 5,597,873, No. 5,385,983, No. 5,610,220, No. 5,633,316, No. 5,674,633, and No. 5,462,972; and Pamphlets of International Publication WO99/42494, WO99/43720, and WO99/42496, and the like. Surface-crosslinking methods disclosed in the above Literatures are also applicable in the present invention.

In the surface-crosslinking process, an aqueous liquid or the like may further be added after termination of crosslinking reaction, and before the granulation of the water-absorbent polymer. For example, water-soluble polyvalent metal salt such as an aluminum sulfate aqueous solution may be added. Such methods are disclosed in Patent Literatures such as U.S. Pat. No. 5,369,148, United States Patent Application Publication No. 2007/141338, Pamphlets of International Publication WO2004/69915 522181, WO2004/69293 522181, and the like, and are applicable in the present invention.

The particulate water-absorbent polymer of the present invention is adjusted to have moisture content described later, through the surface-crosslinking process.

(11) Moisture Content Adjusting Process

In order to attain the object, the present invention is arranged such that water content (moisture content) of its final product is adjusted to not more than 5 mass %, preferably not more than 3 mass %, more preferably 0 to 2 mass %, particularly preferably 0 to 1 mass %, with respect to the water-absorbent polymer, through heating processes such as the aforementioned drying process and the surface-crosslinking process. The moisture content is adjusted by performing heating at the aforementioned high temperature for a predetermined period.

The water-absorbent polymer may further be subjected to water content (moisture content) adjusting process, if necessary, after the water content of the water-absorbent polymer is adjusted to be within the range defined above.

If the water content of the water-absorbent polymer used in the final product is out of the ranges defined above, coloring reaction of the water-absorbent polymer is accelerated. This is not preferable because long-term color stability of the present invention will be lost.

(12) Other Processes

If necessary, the water-absorbent polymer may be subjected to processes of such as pulverization, classification, granulation, after the above processes. Methods of the pulverization, classification, granulation, or the like are disclosed for example in Pamphlet of International Publication WO2004/69915.

(13) Water-absorbent Polymer

The present invention provides a novel water-absorbent polymer, which is produced by for example the methods described above. Means for achieving a particle size and physical properties is already described above; however, a method of producing the water-absorbent polymer is not limited to those described above.

The particulate water-absorbent polymer of the present invention obtained as described above is such that 95% or more of the particulate water-absorbent polymer advantageously has a particle size of 10 to 10000 µm, and more advantageously 100 to 1000 µm.

The water-absorbent polymer obtainable in the present invention is safe, excellent in cost performance, and suitably used for a sanitary material such as a disposable diaper. The water-absorbent polymer used in the sanitary material keeps a clean-imaged white condition even over long-term storage under a high humidity and a high temperature. Further, the water-absorbent polymer obtainable in the present invention is a water-absorbent polymer particle with long-term color stability, in which a particle after 7-day exposure to atmosphere of 70±1° C. of temperature and 65±1% of relative humidity exhibits an L value (Lightness) of at least 70 in Hunter's Lab color system measured by a spectral calorimeter.

That is, the particulate water-absorbent polymer of the present invention contains 30 to 500 ppm by mass of phosphorous compound and satisfies at least one of the followings (a) to (c):

(a) a particle of the particulate water-absorbent polymer after 7-day exposure to atmosphere of 70±1° C. of temperature and 65±1% of relative humidity exhibits an L value (Lightness) of 70 or higher in Hunter's Lab color system;

(b) the particulate water-absorbent polymer contains particles having a diameter of less than 150 µm in an amount of 0 to 5 mass %; a mass median particle size (D50) is 200 µm to 600 µm; and a logarithmic standard deviation ($\sigma\zeta$) of a particle size distribution is 0.20 to 0.40; and (c) an absorbency against pressure (AAP) under pressure of 1.9 kPa or 4.8 kPa for 0.90 mass % sodium chloride aqueous solution for 60 minutes is at least 20 (g/g).

For attaining the object of the present invention, the phosphorous compound is contained in an amount of preferably 50 to 300 ppm by mass, and more preferably in an amount of 70 to 200 ppm by mass.

Characteristics of the particulate water-absorbent polymer of the present invention are described as follows.

(a) Long-term Color Stability

The water-absorbent polymer obtainable in the present invention is suitably used in a sanitary material such as a disposable diaper, and keeps its remarkably white condition associated with clean impression. That is, water-absorbent polymer particles that have been exposed under atmosphere of 70±1° C. of temperature and 65±1% of relative humidity for 7 days present high level of whiteness, which is represented by an L value as set forth below. The water-absorbent polymer particles having high level of whiteness provide an excellent clean impression when they are in practical use in an absorbing article. Specifically, the particulate water absorbent, i.e., the surface-crosslinked particulate water-absorbent polymer obtainable in the above-described processes, exhibits, in Hunter's Lab color system, the L value (Lightness) of at least 90, preferably 92 or higher, and more preferably 95 or higher; a b value of at least 12 or lower, preferably 10 or lower, and more preferably 8 or lower; and a YI value of at least 10 or lower, preferably 9 or lower, and more preferably 8 or lower. The particulate water absorbent satisfying the ranges defined above is in remarkably white condition giving the clean impression. If the particulate water absorbent does not satisfy the ranges defined above, a commercial value of a diaper will be reduced due to coloration caused over long periods of time when the particulate water absorbent is used in the absorbing article such as the diaper.

(b) Particle Size

The water-absorbent polymer of the present invention is in a particle shape, and preferably controlled into a specific particle size. The particle size can be adjusted as needed by pulverization, classification, granulation, fine powder collection, or the like.

A mass median particle size (D50) of the water-absorbent polymer is 200 to 600 µm, preferably 250 to 550 µm, more preferably 200 to 500 µm, and particularly preferably 350 to 450 µm. An amount of particles having a particle size of less than 150 μm is preferably as small as possible, and is generally controlled to 0 to 5 mass %, preferably 0 to 3 mass %, and particularly preferably 0 to 1 mass %. Further, an amount of particles having a particle size of 850 μm is preferably as small as possible, and generally controlled to 0 to 5 mass %, preferably 0 to 3 mass %, and particularly preferably 0 to 1 mass %. A logarithmic standard deviation ($\sigma\zeta$) of a particle size distribution is preferably 0.20 to 0.40, more preferably 0.27 to 0.37, and further preferably 0.25 to 0.35. If the water-absorbent polymer does not satisfy the ranges of the particle size distribution defined above, the water-absorbent polymer cannot be so suitable for use in an absorbing article such as disposable diaper.

Furthermore, a bulk density (specified in JIS K-3362) is controlled to preferably 0.40 to 0.90 g/ml, and more preferably 0.50 to 0.80 g/ml. Moreover, the particles having a particle size of 600 to 150 μm is preferably 60 to 100 mass %, more preferably 70 to 100 mass %, and further preferably 80 to 100 mass %, with respect to a total amount of the particles.

(c) Absorbency Against Pressure (AAP)

In the present invention, a particulate water-absorbent polymer is controlled so as to have an absorbency against pressure (AAP) of preferably 20 (g/g) or more, and more preferably 25 (g/g) or more, for example by the surface-crosslinking described above. The AAP is measured under pressure of 1.9 kPa or 4.8 kPa for 0.9 mass % sodium chloride aqueous solution.

The absorbency against pressure (absorbing ability, AAP) under pressure of 1.9 kPa or 4.8 kPa of less than 20 (g/g) is not preferable, because if the particulate water-absorbent polymer having the AAP defined above is used in, for example, a diaper, an amount of liquid squeezed out from the diaper, i.e., Re-wet, increases, and this may cause skin roughness on a baby.

(d) Absorbency without Pressure (Centrifuge Retention Capacity, Gel Volume Saline/GVs)

In the present invention, the particulate water-absorbent polymer is adjusted to have an absorbency without pressure (GVs) for 0.9 mass % sodium chlorine aqueous solution of preferably not less than 10 g/g, more preferably not less than 20 g/g, further preferably not less than 25 g/g, and particularly preferably not less than 30 g/g, for example by polymerization described above. The GVs is preferably as high as possible and there is no upper limit for the GVs; however, taking into consideration a balance with other physical properties, the GVs is preferably 50 (g/g) or less, more preferably 45 (g/g) or less, and further preferably 40 (g/g) or less.

The particulate water-absorbent polymer having the absorbency without pressure (GVs) of less than 10 (g/g) is not suitable for use in a sanitary material such as a diaper, because such particulate water-absorbent polymer absorbs too small amount of liquid to be used for the sanitary material. On the contrary, the particulate water-absorbent polymer having the absorbency without pressure (GVs) of more than 50 (g/g) is weak in gel strength. With such a particulate water-absorbent polymer, it may be impossible to obtain a water-absorbent that excels in liquid permeability.

(e) Water Soluble Content (Extractable Content)

The water-absorbent polymer of the present invention is produced so as to have water soluble content of preferably 0 to 35 mass %, more preferably not more than 25 mass %, further preferably not more than 15 mass %, and particularly preferably not more than 10 mass %, for example by the polymerization described above. The water-absorbent polymer having the water soluble content of more than 35 mass. % may be weak in gel strength and inferior in liquid permeability. In addition, absorption capacity (GVs, AAP, and the like) of such water-absorbent polymer may decrease over time when the water-absorbent polymer is used in a diaper for long periods of time.

(f) Residual Monomer

The water-absorbent polymer of the present invention is produced so as to have residual monomers in an amount within a range of preferably 0 to 400 ppm by mass, more preferably 0 to 300 ppm by mass, and particularly preferably 0 to 200 ppm by mass, for example by the polymerization described above.

(g) Deterioration-Induced Extractable Content

In the water-absorbent polymer of the present invention, which is produced for example by the polymerization described above, deterioration-induced extractable content (content that would become extractable due to deterioration) is in an amount within a range of 0 to 18 mass %, preferably 0 to 15 mass %, and further preferably 0 to 12 mass %.

An amount of the deterioration-induced extractable content is an index of long-term stability of the water-absorbent polymer. When the water-absorbent polymer absorbs urine or the like and turns into a gel form, the polymer is degraded by minute components contained in the urine, and as a result, the polymer (gel) becomes soluble due to deterioration over time. That is, a high deterioration-induced extractable content indicates that the gel more likely becomes soluble over time.

(14) Other Additives

In order to further add a variety of functions depending on a desired purpose, the particulate water-absorbent polymer according to the present invention may be produced by adding, to a water-absorbent polymer (water-absorbent resin), organic acid, an oxidant, and a reductant such as sulfite (bisulfite) salt; a polyvalent metal compound exemplified in Pamphlets of International Publication WO2004/69915, WO2004/113452, and WO2005/108472; water-soluble inorganic and organic powder such as silica and metal soap; a deodorizer; an antibacterial agent; polymer polyamine; pulp; thermoplastic fiber; or the like, in an amount of 0 to 3 mass %, and preferably 0 to 1 mass %.

(15) Use

The water-absorbent polymer of the present invention may be used for any purpose; however, it is preferable to be used in an absorbing article such as a disposable diaper, a sanitary napkin, and an incontinence pad. In particular, it is preferable to be used in a concentrated diaper (a diaper within which a large amount of water-absorbent polymers (water-absorbent resin) are used), which has conventionally had problems such as odor and coloration attributed to raw materials of the water-absorbent polymer.

An absorbing article of the present invention includes the water-absorbent polymer, an absorbent core obtainable by shaping hydrophilic fiber into a sheet (if needed), a top sheet having liquid permeability, and a back sheet having no liquid permeability. The particulate water-absorbent polymer of the present invention provides excellent performance especially in a case where it is used in an upper layer part of the absorbent core of the absorbing article.

The absorbent core without the hydrophilic fiber is made by fixing the particulate water-absorbent polymer on a piece of paper and/or nonwoven fabric. In a case where a fiber material (pulp) is used, the absorbent core is made in such a manner that the particulate water-absorbent polymer is sandwiched by the fiber materials or blended with the fiber material. Examples of the fiber material that can be used encompass: fractured wood pulp; cotton linter and crosslinked cellulose fiber; rayon; cotton; wool; acetate; vinylon; and the like. Especially preferred are those air-laid.

An effect of the present invention is provided in a case where a contained amount (core concentration) of the water-absorbent polymer in the absorbent core of the absorbing article is 30 to 100 mass %, preferably 40 to 100 mass %, more preferably 50 to 100 mass %, further preferably 60 to 100 mass %, particularly preferably 70 to 100 mass %, and most preferably 75 to 95 mass %. For example, in a case where the particulate water-absorbent polymer of the present invention is used especially in the upper layer part of the absorbent core in the amount described above, the absorbent core becomes excellent in liquid permeability (liquid permeability under pressure) and in diffuseness of absorption liquid such as urine. Accordingly, the absorption liquid is efficiently distributed on the absorbing article such as the disposable diaper, and thereby an absorbing amount in the entire absorbing article is improved. As a result, it is possible to provide an absorbing article including an absorbent core that keeps its hygienic white condition.

The absorbent core is preferably compression-molded into a density of not less than 0.06 g/cc but not more than 0.50 g/cc, and a basis weight of not less than 0.01 g/cm$^2$ but not more than 0.20 g/cm$^2$. Further, if a thickness of the absorbent core is not more than 30 mm, and preferably not more than 20 mm, it is possible to provide an absorbing article that is suitably applicable to a thinner disposable diaper.

EXAMPLES

The present invention is further described through the following Examples. However, it is not intended to limit the present invention to the following Examples. Properties (a) to (g) described in Claims and Embodiment of the present invention were worked out through the following measurement methods. Note that the following measurement methods are for a particulate water-absorbent polymer; however, other forms of water-absorbent polymers such as a water absorbent that is described as a surface-crosslinked water-absorbent polymer in Examples and a particulate water-absorbent polymer are also measured through the measurement methods. Further, the term "weight" is equivalent to "mass".

(1) Evaluation of Polymerizability

On the basis of a polymerization condition (especially polymerization period) in Production Examples, polymerizability was evaluated by measuring a time from an initiation of the polymerization to a termination of the polymerization reaction (a point at which the polymerization reaction reaches a peak temperature).

Same as Production Example: YES

Different from Production Example: NO (2) Absorbency without Load (Gel Volume Saline/GVs)

0.2 g of the particulate water-absorbent polymer was evenly contained in a bag (60×60 mm) made of a nonwoven fabric and was sealed. Then, the bag was soaked in 100 g of 0.9 mass % sodium chloride aqueous solution (physiological saline) at 25 (±3)° C., and was withdrawn 30 minutes later. By use of a centrifugal separator, the bag was drained for three minutes at centrifugal force 250 G, and a weight W1 of the bag was measured. Further, the same operation was performed without using the particulate water absorbent, and a weight W2 was measured. Then, from the weights W1 and W2, absorbency was calculated through the following Mathematical Formula 1.

$$GVs=(W1-W2)/0.2-1 \quad \text{Formula 1}$$

(3) Water Soluble Polymer Content and Extractable Content Ratio

Note that water soluble polymer content hereinafter may be referred to as an amount of extractable content. A water soluble polymer may also be referred to as an extractable content. An extractable content ratio is a ratio (mass %) of the extractable content with respect to the water-absorbent polymer.

Into a 250 ml plastic container having a cover, 184.3 g of 0.90 mass % sodium chlorate aqueous solution was measured and pored. Into the solution, 1.00 g of the water-absorbent polymer was added, and the plastic container containing the solution and the water-absorbent polymer was stirred for 16 hours, thereby extracting the extractable content from resin. An extract solution obtained was filtered through a piece of filter paper (ADVANTEC toyo kaisha, Ltd.; product name: JIS P3801, No. 2, thickness: 0.26 mm, diameter of retainable particles: 5 μm), thereby obtaining a filtrate. Then, 50.0 g of the filtrate was measured so as to be used as a measurement solution.

First, only 184.3 g of the physiological saline (0.90 mass % sodium chlorine aqueous solution) was titrated by using a 0.1N NaOH solution until pH of the saline reached pH10. Thereafter, the saline was titrated by using a 0.1N HCl solution until pH of the saline reached pH2.7. In this way, blank titration amounts ([bNaOH]ml and [bHCl]ml) were measured. The same operation was performed with respect to the measurement solution, thereby measuring titration amounts ([NaOH]ml and [HCl]ml). For example in a case of a particulate water absorbent including a known amount of acrylic acid and its salt, the extractable content ratio of the water-absorbent polymer can be calculated in accordance with the following Mathematical Formula 2, from an average molecular weight of monomers of the water absorbent and the titration amounts obtained by the foregoing operation. A main component of the extracted extractable content is the extracted water-soluble polymer. In a case where the average molecular weight of the monomer is unknown, the average molecular weight of the monomer can be calculated by using a neutralization ratio worked out by titration. The neutralization ratio is calculated through the following Mathematical Formula 3.

$$\text{Extractable Content Ratio(mass \%)}=0.1\times(\text{average molecular weight of monomer})\times184.3\times100\times([\text{HCl}]-[\text{bHCl}])/1000/1.0/50.0 \quad \text{Formula 2}$$

$$\text{Neutralization Ratio(mol \%)}=(1-([\text{NaOH}]-[\text{bNaOH}])/([\text{HCl}]-[\text{bHCl}]))\times100 \quad \text{Formula 3}$$

It should be noted that in a case of polymer with high moisture content, e.g., a hydrogel crosslinked polymer, the extractable content ratio can be measured by calculating solid content of the water-absorbent polymer from the moisture content, and then using a given amount of the hydrogel crosslinked polymer.

(4) Residual Monomer

A residual monomer (residual acrylic acid and salt thereof) of the water-absorbent polymer after drying was analyzed in terms of ppm by mass (with respect to the particulate water absorbent) of the residual monomer of a particulate water absorbent, by performing a UV analysis via a liquid chromatography on a filtrate that has been separately prepared through two hours of agitation in the above (2). The residual monomer of a hydrogel polymer before the drying was calculated by: stirring a minced hydrogel polymer containing approximately 500 mg of resin solid contents for 16 hours; performing the UV analysis via the liquid chromatography on thus obtained filtrate; and then adjusting the solid content.

(5) Coloring Evaluation with Respect to Water-Absorbent Polymer (Hunter's Lab Color System/L Value)

Coloring of the water-absorbent polymer was evaluated by using a spectral calorimeter SZ-Σ80 COLOR MEASURING SYSTEM (NIPPON DENSHOKU). A reflection measurement was selected as a preset condition of measurement, and an accessory powder-paste sample table having internal diameter of 30 mm and height of 12 mm was used. Further, a powder-paste standard rounded white plate No. 2, and 30Φ floodlight pipe were used as a standard. About 5 g of particulate water absorbent was provided in the built-in sample table (so as to occupy about 60% of the built-in sample table). Then, an L value (Lightness: lightness index) of a surface was measured by the spectral colorimeter at room temperature (from 20 to 25° C.) and humidity of 50 RH %. This value indicates "lightness index before exposure".

At the same time, it is possible to measure other values such as an a value and a b value (chromaticity), a YI (Yellowness Index), and a WB (White Balance) by performing the same method with use of the same apparatus. As the WB becomes higher and the YI, a value, and b value become lower, the water-absorbent polymer becomes less colored and becomes closer to substantial white.

Next, about 5 g of the particulate water absorbent was placed in the paste sample table, and the paste sample table containing the particulate water absorbent was exposed for 7 days in a thermo-hygrostat (TABAI ESPEC CORPORATION, PLATINOUS LUCIFFER, PL-2G) in which temperature had been adjusted to 70±1° C. and relative humidity had been adjusted to 65±1%. The exposure was a test for promoting coloring for 7 day. After the exposure, the L value (Lightness) of the surface was measured by the spectral colorimeter. The value thus measured indicates "L value (Lightness) of the particle in Hunter's Lab color system after 7-day exposure in atmosphere at 70±1° C. and 65±1% of relative humidity". The a value, b value, and YI value were also measured under the same condition.

(6) Absorbency Against Pressure (AAP)

With reference to U.S. Pat. No. 6,228,930, No. 6,071,976, and No. 6,254,990, absorbency against pressure (under load) of the particulate water absorbent for physiological saline was measured. According to the method described in the United States Patents cited above, a weight of the physiological saline absorbed in 0.9 g of particulate water absorbent under a predetermined load (1.9 kPa or 4.8 kPa) over 60 minutes was calculated from a weight measured by using a balance. The same was performed without using the particulate water absorbent so as to calculate a weight of a physiological saline 11 absorbed in a material other than the particulate water absorbent, such as a filter paper 7, from a weight measured by using a balance 1. Thus measured weight represents a blank value. Next, the absorbency against pressure under pressure of 1.9 kPa and 4.8 kPa (g/g) were calculated by dividing a weight of the physiological saline actually absorbed in the particulate water absorbent (calculated by subtracting the blank value from the measured weight of the physiological saline absorbed) by the weight of the particulate water absorbent (0.9 g).

The measuring method is specifically described as follows. On a bottom of a plastic supporting cylinder 100 having a 60 mm internal diameter, a stainless metal net 101 of 400 mesh (mesh size of 38 μm) was fusion-bonded. Then, 0.900 g of a particulate water absorbent 102 was evenly dispersed on the stainless metal net 101. Subsequently, a piston 103 and a load 104, which had been so adjusted as to evenly apply a 4.8 kPa (0.7 psi) load onto the particulate water absorbent, were placed in this order on the particulate water absorbent. External diameters of the piston 103 and the load 104 were slightly smaller than 60 mm which was the internal diameter of the supporting cylinder 100, so that there was no gap between the piston and the supporting cylinder, and upward and downward movements of the piston 103 and the load 104 would not be hampered. Then, a weight W3 (g) of the entire measuring apparatus was measured.

In a case of measuring the absorbency against pressure under pressure of 1.9 kPa (0.3 psi), the above procedure is performed with use of a 1.9 kPa load instead of the 4.8 kPa load.

Inside a petri dish 105 having a 150 mm diameter, a glass filter 106 (Sougo Rikagaku Glass Seisakusho Co., Ltd.; diameter of fine pores: 100 μm to 120 μm) having a 90 mm diameter was placed. Thereafter, physiological saline 108 (20° C. to 25° C.) was added until it reached a level of an upper surface of the glass filter. Then, a piece of filter paper 107 (Advantec Toyo Kaisha, Ltd.; product name: JIS P3801, No. 2; thickness: 0.26 mm; diameter of retained particles: 5 μm) having a 90 mm diameter was placed thereon so that an entire surface of the filter paper 107 was wetted. An excess of the physiological saline 108 was removed.

A set of the measuring apparatus was placed on the wet filter paper. Then, the water absorbent was made to absorb the solution under the load. One hour later, the set of the measuring apparatus was lifted, and a weight W4 (g) thereof was measured. From the weights W3 and W4, the absorbency against pressure (g/g) was calculated according to the following Mathematical Formula 4.

$$AAP=(W4-W3)/0.9 \quad \text{Formula 4}$$

(7) Deterioration-Induced Extractable Content Ratio

A 35 mm stirrer chip was added to a 250 ml plastic container with a cover. Then, 200.0 g of 0.90 mass % sodium chlorine aqueous solution containing 0.05% L-ascorbic acid was measured and pored into the plastic container, and thereafter, 1.00 g of the particulate water absorbent which had been classified to 600/300 μm was added. The plastic container was stopped tightly with an internal cover and an external cover.

The plastic container was allowed to stand for two hours inside a thermostat in which temperature had been adjusted to 60±2° C. Two hours later, the plastic container was removed from the thermostat, and then content of the plastic container was stirred with use of a stirrer (approximately 150 rpm) for an hour so as to extract extractable content of the particulate water absorbent. The extracted solution containing the extractable content was filtered through a piece of filter paper (Advantec Toyo Kaisha, Ltd.; product name: JIS P3801, No. 2; thickness: 0.26 mm; diameter of retained particles: 5 μm), and 50.0 g of the filtrate obtained was used as a measuring solution. Thereafter, the same procedure as the measurement of extractable content ratio (neutralizing titration) was performed so as to calculate the extractable content ratio. Thus obtained extractable content ratio (mass %) is a deterioration-induced extractable content ratio.

(8) Moisture Content

Firstly, 1.00 g of the water-absorbent polymer was measured and poured into an aluminum cup having a bottom surface of about 50 mm in diameter, and a total weight W5 (g) of the water-absorbent polymer and the aluminum cup was measured. Then, the aluminum cup was left to stand for 3 hours in an oven at 180° C. so that the water-absorbent polymer was dried. Three hours later, the aluminum cup containing the water-absorbent polymer was removed from the oven and cooled down to a room temperature, and thereafter, a sum of weight W6 (g) of the aluminum cup and the water-absorbent polymer after drying was measured. The solid content was calculated according to the following Mathematical Formula 5.

Moisture Content(mass %)=((W5−W6)/(weight(g) of water-absorbent resin)×100)   Formula 5

(9) Iron (Fe) Content of Water-absorbent Polymer 1.000 g of the particulate water-absorbent polymer was measured and pored into a platinum crucible. The platinum crucible was heated with use of an electrical furnace (YAMATO SCIENTIFIC CO., LTD, Muffle Furnace FO300) so that the particulate water-absorbent polymer contained in the platinum crucible was ashen.

After the platinum crucible was removed from the electrical furnace, approximately 5 ml of nitric acid aqueous solution (an aqueous solution prepared by mixing special grade nitric acid of Wako Pure Chemical Industries, Ltd. and an ion-exchange water in a ratio of 1:1) was added so as to dissolve the ash. Thereafter, the ion-exchange water was further added to obtain approximately 15 ml of an aqueous solution of the ash.

The same procedure was followed by using a platinum crucible without the particulate water-absorbent polymer so as to obtain a blank.

Fe content of the aqueous solution obtained in the above procedure was measured with ICP emission spectrometry described in JISK1200-6. The ICP emission spectrometry apparatus used here was ULTIMA, which is a product of HORIBA, Ltd.

Production Example 1

In a reactor formed by attaching a cover to a double-arm type stainless kneader having a capacity of 10 liters and equipped with two sigma type blades and a jacket, a reaction liquid was obtained by dissolving 0.10 mol % (with respect to a total monomer) of polyethylene glycol diacrylate to 5500 g of sodium acrylate aqueous solution (monomer concentration was 37.7 wt %, iron content (based on $Fe_2O_3$) was 0.1 ppm by mass, p-methoxyphenol content was 50 ppm by mass, protoanemonin and/or furfural content were N.D. (not detectable)) having a neutralization ratio of 75 mol %. In the polyethylene glycol diacrylate serving as an internal crosslinking agent, an average addition molar number n of ethyleneoxide was 8.2. Next, a monomer solution was added to the sigma type double-arm kneader while being maintained at 35° C., and thereafter, nitrogen gas was blown into the kneader so as to replace inside air with nitrogen so that oxygen dissolved in a system was not more than 1 ppm by mass. Subsequently, 35.8 g of 10 wt % sodium persulfate aqueous solution and 1.49 g of 1 wt % L-ascorbic acid aqueous solution were added to the reaction liquid while being stirred. About 20 seconds later, the monomer solution reached 35.5° C., and then polymerization started.

The polymerization was carried out while a gel generated by the polymerization was being stirred. After 14 minutes from polymerization initiation, a polymerization temperature reached its peak temperature of 95° C. After 44 minutes from the polymerization initiation, a hydrogel crosslinked polymer (1) was removed. Amount of extractable content of the hydrogel crosslinked polymer (1) was 1.1%. Thus obtained hydrogel crosslinked polymer (1) had been minced into a diameter of approximately not more than 5 mm. The minced hydrogel crosslinked polymer (1) was spread on a metal net of 20 mesh (a mesh opening size is 850 μm), and then hot-air dried at 180° C. for 45 minutes. The dried hydrogel crosslinked polymer (1) was pulverized with a roller mill, and then classified with a JIS standard sieves having a mesh opening size of 850 μm and 150 μm so as to obtain a water-absorbent polymer (a) in which a mass median particle size was 300 μm, σζ=0.35, and particles having a diameter of less than 150 μm accounted for 2% of a total amount of the particles. The water-absorbent polymer (a) had a b value of 5.2 before exposure, and a b value of 16.1 after the exposure. Other physical properties of the water-absorbent polymer (a) are described in Table 1.

Production Example 2

The water-absorbent polymer was produced with use of an apparatus illustrated in FIG. 3 of United States Patent Application Publication No. 2004/0092688.

With use of an apparatus illustrated in FIG. 1 of aforementioned United States Patent Application Publication No. 2004/0092688, a monomer solution 20 was prepared by adjusting (i) 48.5 wt % aqueous sodium hydroxide (iron content (based on $Fe_2O_3$) was 0.5 ppm by mass) so that a flow rate thereof was 5.12 g/s, (ii) acrylic acid (p-methoxyphenol content was 80 ppm by mass, protoanemonin content and/or furfural content were N.D. (not detectable)) so that the flow rate thereof was 6.10 g/s, (iii) 30 wt % polyethylene glycol diacrylate aqueous solution (I) so that the flow rate thereof was 0.15 g/s, (iv) a solution (II) obtained by mixing 50.0 parts by mass of 1.0 wt % 2-hydroxymethyl-2-methylpropiophenone acrylic acid solution and 50.0 parts by mass of 0.5 wt % trisodium diethylenetriamine-pentaacetic acid aqueous solution so that the flow rate thereof is 0.16 g/s and (v) water so that the flow rate thereof was 4.81 g/s. A temperature of the monomer solution 20 was stable and approximately 95° C.

In the polyethylene glycol diacrylate serving as an internal crosslinking agent, an average addition molar number n of ethyleneoxide was 8.2.

The monomer solution 20 was stirred by use of a static mixer formed by inserting an element (length: 18.6 mm, diameter: 6 mm) that was twisted 540 degrees into a pipe (diameter: 6 mm), and thereafter, 2 wt % sodium persulfate aqueous solution, which was a polymerization initiator, was added at a flow rate of 0.151 g/s at a point approximately 3 cm downstream of an end point of the element, thereby obtaining a mixture liquid 40. A stirring Reynolds number at this point was calculated to be 2280 (ρ=1160, μ=0.001). The mixture liquid 40 was supplied to a belt polymerization apparatus 70 so as to be continuously polymerized, thereby obtaining a band of hydrogel polymer. The belt polymerization apparatus 70 includes: a fluoropolymer coated endless belt (length: 3.8 m, width: 60 cm); a UV lamp located above the endless belt; and an induction pipe located in the middle of the belt polymerization apparatus 70, wherein a bottom surface and surrounding area thereof of the endless belt were heated up to and maintained at approximately 100° C., and the induction pipe collects distilled water. A length of the pipe from a point of addition of the polymerization initiator to a discharge hole toward a polymerization apparatus was 30 cm. The band of hydrogel polymer whose surface temperature was approximately 70° C. was continuously crushed with use of a meat chopper, hot-air dried at 180° C., and then pulverized with use of a roller mill. Thereafter, the pulverized product was further classified and blended by use of JIS standard sieves having a mesh opening size of 850 μm and 150 μm, thereby obtaining a water-absorbent polymer (b) in which a mass median particle size was 310 μm, σζ=0.36, and particles having a diameter of less than 150 μm accounted for 2% of a total amount of the particles. Physical properties of the water-absorbent polymer (b) obtained are described in Table 1.

Example 1

In a reactor formed by attaching a cover to a double-arm type stainless kneader having a capacity of 10 liters and equipped with two sigma type blades and a jacket, a reaction liquid was obtained by dissolving 0.10 mol % (with respect to a total monomer) of polyethylene glycol diacrylate to 5500 g of sodium acrylate aqueous solution (monomer concentration was 37.7 wt %, iron content (based on $Fe_2O_3$) was 0.1 ppm by mass, p-methoxyphenol content was 50 ppm by mass, protoanemonin and/or furfural content were N.D. (not detectable)) having a neutralization ratio of 75 mol %. In the polyethylene glycol diacrylate serving as an internal crosslinking agent, an average addition molar number n of ethyleneoxide was 8.2. Next, a monomer solution was added to the sigma type double-arm kneader while being maintained at 35° C., and thereafter, nitrogen gas was blown into the kneader so as to replace inside air with nitrogen so that oxygen dissolved in a system was not more than 1 ppm by mass. Subsequently, 35.8 g of 10 wt % sodium persulfate aqueous solution, 1.49 g of 1 wt % L-ascorbic acid aqueous solution, and 50 ppm by mass (with respect to a total monomer) of ethylenediaminetetra (methylene phosphonic acid) were added to the reaction liquid while being stirred. About 20 seconds later, the monomer solution reached 35.5° C., and then polymerization started.

The polymerization was carried out while a gel generated by the polymerization was being crushed. After 14 minutes from polymerization initiation, a polymerization temperature reached its peak temperature of 96° C. After 44 minutes from the polymerization initiation, a hydrogel crosslinked polymer (2) was removed. Amount of extractable content of the hydrogel crosslinked polymer (2) was 7.9 mass %.

The obtained hydrogel crosslinked polymer (2) had been minced into a diameter of approximately not more than 5 mm. The minced hydrogel crosslinked polymer (2) was spread on a metal net of 20 mesh (a mesh opening size is 850 µm), and then hot-air dried at 180° C. for 45 minutes. The dried hydrogel crosslinked polymer (2) was pulverized with a roller mill, and then classified with JIS standard sieves having a mesh opening size of 850 µm and 150 µm so as to obtain a water-absorbent polymer (1) in which a mass median particle size was 305 µm, σζ=0.35, and particles having a diameter of less than 150 µm accounted for 2% of a total amount of the particles. Physical properties of the water-absorbent polymer (1) are described in Table 1.

Example 2

Example 2 was performed in the same manner as in Example 1, except that an additive amount of the ethylenediaminetetra (methylene phosphonic acid) was 100 ppm by mass. The polymerization progressed in substantially the same manner as Production Example 1 and Example 1, that is, a polymerization temperature reached its peak temperature of 98° C. after 14.5 minutes from polymerization initiation. Physical properties of a water-absorbent polymer (2) obtained are described in Table 1.

Example 3

In a reactor formed by attaching a cover to a double-arm type stainless kneader having a capacity of 10 liters and equipped with two sigma type blades and a jacket, a reaction liquid was obtained by dissolving 0.10 mol % (with respect to a total monomer) of polyethylene glycol diacrylate, 100 ppm by mass of ethylenediaminetetra (methylene phosphonic acid), and 100 ppm by mass of malic acid to 5500 g of sodium acrylate aqueous solution (monomer concentration was 37.7 wt %, iron content (based on $Fe_2O_3$) is 0.01 ppm by mass, p-methoxyphenol content was 70 ppm by mass, protoanemonin and/or furfural content were N.D. (not detectable)) having a neutralization ratio of 75 mol %. In the polyethylene glycol diacrylate serving as an internal crosslinking agent, an average addition molar number n of ethyleneoxide was 8.2. Next, a monomer solution was added to the sigma type double-arm kneader while being maintained at 22° C., and thereafter, nitrogen gas was blown into the kneader so as to replace inside air with nitrogen so that oxygen dissolved in a system was not more than 1 ppm by mass. Subsequently, 35.8 g of 10 wt % sodium persulfate aqueous solution and 1.49 g of 1 wt % L-ascorbic acid aqueous solution were added to the reaction liquid while being stirred. About 20 seconds later, the monomer solution reached 35.5° C., and then polymerization started.

The polymerization was carried out while a gel generated by the polymerization was being crushed. After 14.5 minutes from polymerization initiation, a polymerization temperature reached its peak temperature of 98° C. After 44 minutes from the polymerization initiation, a hydrogel crosslinked polymer was removed.

The obtained hydrogel crosslinked polymer had been minced into a diameter of approximately not more than 5 mm. The minced hydrogel crosslinked polymer was spread on a metal net of 20 mesh (a mesh opening size was 850 µm), and then hot-air dried at 180° C. for 45 minutes. The dried hydrogel crosslinked polymer was pulverized with a roller mill, and then classified with JIS standard sieves having a mesh opening size of 850 µm and 150 µm so as to obtain a water-absorbent polymer (3) in which a mass median particle size was 300 µm, σζ=0.35, and particles having a diameter of less than 150 µm accounted for 2% of a total amount of the particles. Physical properties of the water-absorbent polymer (3) are described in Table 1.

Example 4

A water-absorbent polymer was produced with use of an apparatus used in Production Example 2. The water-absorbent polymer was prepared in the same manner as in Production Example 1, except that a flow rate of 48.5 wt % aqueous sodium hydroxide was 5.12 g/s, flow rate of acrylic acid was 6.10 g/s, flow rate of 30 wt % polyethylene glycol diacrylate (in which an average addition molar number n of ethyleneoxide was 8.2) aqueous solution (I) was 0.15 g/s, flow rate of a solution (III) obtained by mixing 33.4 parts by mass of 1.0 wt % 2-hydroxymethyl-2-methylpropiophenone acrylic acid solution and 66.6 parts by mass of 0.5 wt % ethylenediaminetetra (methylenephosphonic acid) aqueous solution was 0.23 g/s, and flow rate of water was 4.7 g/s.

The water-absorbent polymer obtained was a water-absorbent polymer (4) in which a mass median particle size was 310 µm, σζ=0.36, and particles having a diameter of less than 150 µm accounted for 2% of a total amount of the particles. Physical properties of the water-absorbent polymer (4) are described in Table 1.

Example 5

Example 5 was performed in the same manner as in Example 4, except that an amount of the solution (III)

obtained by mixing 21.1 parts by mass of 1.0 wt % 2-hydroxymethyl-2-methylpropiophenone acrylic acid solution and 78.9 parts by mass of 0.5 wt % ethylenediaminetetra (methylene phosphonic acid) aqueous solution was 0.38 g/s.

A water-absorbent polymer obtained was a water-absorbent polymer (5) in which a mass median particle size was 305 μm, σζ=0.36, and particles having a diameter of less than 150 μm accounted for 2% of a total amount of the particles.

Physical properties of the water-absorbent polymer (5) are described in Table 1.

Example 6

A surface-crosslinking agent including 0.4 parts by mass of 1,4-butanediol, 0.6 parts by mass of propylene glycol, and 3.0 parts by mass of ion exchange water was sprayed and mixed into 100 parts by mass of the water-absorbent polymer (1) obtained in Example 1. The water-absorbent polymer (1) was then heat-treated at 210° C. for 40 minutes, thereby obtaining a water absorbent (1). The water absorbent (1) had a mass median particle size of 390 μm, σζ=0.35, and particles having a diameter of less than 150 μm accounted for 1% of a total amount of the particles. A b value of the water absorbent (1) before exposure was 5.1, and a b value after the exposure was 8.5. Other physical properties of the water absorbent (1) are described in Table 1. It should be noted that AAP in Table 1 is an absorbency against pressure under pressure of 4.8 kPa for 0.90 mass % sodium chloride aqueous solution for 60 minutes. The same applies to the other Examples and Comparative Examples.

Example 7

Example 7 was performed in the same manner as in Added Example 5, except that a water-absorbent polymer (5) was used instead of the water-absorbent polymer (1) of Example 6, so as to obtain a water absorbent (2). The water absorbent (2) had a mass median particle size of 400 μm, σζ=0.36, and particles having a diameter of less than 150 μm accounted for 1% of a total amount of the particles. Physical properties of the water absorbent (2) are described in Table 1.

Example 8

4 parts by mass of 1.0 wt % ethylenediaminetetra (methylene phosphonic acid) aqueous solution was sprayed and mixed into 100 parts by mass of the water-absorbent polymer (4) obtained in Example 4. The water-absorbent polymer (4) was then hot-air dried at 60° C. for 1 hour, thereby obtaining a water-absorbent polymer (6).

A surface-crosslinking agent including 0.4 parts by mass of 1,4-butanediol, 0.6 parts by mass of propylene glycol, and 3.0 parts by mass of ion exchange water was sprayed and mixed into 100 parts by mass of the obtained water-absorbent polymer (6). The water-absorbent polymer (6) was then heat-treated at 210° C. for 40 minutes, thereby obtaining a water absorbent (3). The water absorbent (3) had a mass median particle size of 380 μm, σζ=0.35, and particles having a diameter of less than 150 μm accounted for 1% of a total amount of the particles. Physical properties of the obtained water absorbent (6) and the water absorbent (3) are described in Table 1.

Comparative Example 1

In a reactor formed by attaching a cover to a double-arm type stainless kneader having a capacity of 10 liters and equipped with two sigma type blades and a jacket, a reaction liquid was obtained by dissolving 0.10 mol % (with respect to a total monomer) of polyethylene glycol diacrylate to 5500 g of sodium acrylate aqueous solution (monomer concentration was 37.7 wt %, monomer concentration was 37.7 wt %, iron content (based on $Fe_2O_3$) was 0.1 ppm by mass, p-methoxyphenol content was 50 ppm by mass, protoanemonin and/or furfural content was N.D. (not detectable)) having a neutralization ratio of 75 mol %. In the polyethylene glycol diacrylate serving as an internal crosslinking agent, an average addition molar number n of ethyleneoxide was 8.2. Next, a monomer solution was added to the sigma type double-arm kneader while being maintained at 35° C., and thereafter, nitrogen gas was blown into the kneader so as to replace inside air with nitrogen so that oxygen dissolved in a system was not more than 1 ppm by mass. Subsequently, 35.8 g of 10 wt % sodium persulfate aqueous solution, 1.49 g of 1 wt % L-ascorbic acid aqueous solution, and 500 ppm by mass (with respect to a total monomer) of ethylenediaminetetra (methylene phosphonic acid) were added to the reaction liquid while being stirred. Polymerization did not start even after 5 minutes from the addition.

Comparative Example 2

Comparative Example 2 was performed in the same manner as in Example 4, except that (i) a solution (IV) obtained by mixing 9.1 parts by mass of 1.0 wt % 2-hydroxymethyl-2-methylpropiophenone acrylic acid solution and 90.9 parts by mass of 0.5 wt % ethylenediaminetetra (methylene phosphonic acid) aqueous solution whose flow rate was adjusted to 0.83 g/s was used instead of the solution (III) obtained by mixing 33.4 parts by mass of 1.0 wt % 2-hydroxymethyl-2-methylpropiophenone acrylic acid solution and 66.6 parts by mass of 0.5 wt % ethylenediaminetetra (methylene phosphonic acid) aqueous solution, and (ii) flow rate of water was adjusted to 4.7 g/s. However, a sudden polymerization occurred and a polymerization condition was unstable. The water-absorbent polymer obtained was a comparative water-absorbent polymer (C-2) in which a mass median particle size was 310 μm, σζ=0.36, and particles having a diameter of less than 150 μm accounted for 2% of a total amount of the particles. Physical properties of the obtained comparative water-absorbent polymer (C-2) are described in Table 1.

Comparative Example 3

A surface-crosslinking agent including 0.4 parts by mass of 1,4-butanediol, 0.6 parts by mass of propylene glycol, and 3.0 parts by mass of ion exchange water was sprayed and mixed into 100 parts by mass of the comparative water-absorbent polymer (C-2) obtained in Comparative Example 2. The comparative water-absorbent polymer (C-2) was then heat-treated at 210° C. for 40 minutes, thereby obtaining a comparative water absorbent (C-3). Physical properties of the comparative water absorbent (C-3) obtained are described in Table 1.

Comparative Example 4

0.1 mass % of 1-hydroxyethylidene 1,1-di-phosphonic acid was sprayed and mixed into the water-absorbent polymer (a) obtained in Production Example 1. The water-absorbent polymer (a) was then dried at 100° C. for an hour, thereby obtaining a comparative water-absorbent polymer (C-4). An amount of the 1-hydroxyethylidene 1,1-di-phosphonic acid added to the water-absorbent polymer was 0.5 mass %. The b value of the comparative water-absorbent polymer (C-4) before exposure was 9.1, whereas the b value after the exposure was 10.1.

TABLE 1

| | | POLYMERIZABILITY | GVs (g/g) | AAP (g/g) | EXTRACTABLE CONTENT (mass %) | DETERIORATION-INDUCED EXTRACTABLE CONTENT (mass %) |
|---|---|---|---|---|---|---|
| PDN. EX. 1 | WATER-ABSORBENT POLYMER(a) | YES | 33 | — | 5.8 | — |
| PDN. EX. 2 | WATER-ABSORBENT POLYMER(b) | YES | 33 | — | 6.1 | — |
| EX. 1 | WATER-ABSORBENT POLYMER(1) | YES | 33 | — | 9.0 | — |
| EX. 2 | WATER-ABSORBENT POLYMER(2) | YES | 33 | — | 10.0 | — |
| EX. 3 | WATER-ABSORBENT POLYMER(3) | YES | 34 | — | 10.5 | — |
| EX. 4 | WATER-ABSORBENT POLYMER(4) | YES | 32 | — | 7.2 | — |
| EX. 5 | WATER-ABSORBENT POLYMER(5) | YES | 35 | — | 8.3 | — |
| EX. 6 | WATER ABSORBENT(1) | — | 27 | 23 | — | 12.0 |
| EX. 7 | WATER ABSORBENT(2) | — | 28 | 25 | — | 11.5 |
| EX. 8 | WATER-ABSORBENT POLYMER(6) | YES | 32 | — | 7.2 | — |
|  | WATER ABSORBENT(3) | — | 27 | 23 | — | 9.9 |
| COM. EX. 1 | — | NO (NOT POLYMERIZED) | — | — | — | — |
| COM. EX. 2 | COM. WATER-ABSORBENT POLYMER(C-2) | NO** | 37 | — | 16.4 | — |
| COM. EX. 3 | COM. WATER ABSORBENT(C-3) | — | 32 | 15 | — | 19.5 |
| COM. EX. 4 | COM. WATER-ABSORBENT POLYMER(C-4) | — | 29 | 7 | 4.8 | — |

| | | MOISTURE CONTENT (mass %) | RESIDUAL MONOMER (ppm by mass) | L VALUE (Lightness) IN HUNTER'S LAB COLOR SYSTEM | |
|---|---|---|---|---|---|
| | | | | BEFORE BEING EXPOSED | AFTER BEING EXPOSED* |
| PDN. EX. 1 | WATER-ABSORBENT POLYMER(a) | 5.0 | 170 | 91 | 63 |
| PDN. EX. 2 | WATER-ABSORBENT POLYMER(b) | 5.2 | 500 | 91 | 69 |
| EX. 1 | WATER-ABSORBENT POLYMER(1) | 4.2 | 200 | 92 | 75 |
| EX. 2 | WATER-ABSORBENT POLYMER(2) | 4.8 | 210 | 91 | 81 |
| EX. 3 | WATER-ABSORBENT POLYMER(3) | 4.4 | 200 | 92 | 81 |
| EX. 4 | WATER-ABSORBENT POLYMER(4) | 4.1 | 400 | 90 | 80 |
| EX. 5 | WATER-ABSORBENT POLYMER(5) | 4.0 | 520 | 91 | 82 |
| EX. 6 | WATER ABSORBENT(1) | 1.0 | — | 92 | 80 |
| EX. 7 | WATER ABSORBENT(2) | 1.2 | — | 90 | 80 |
| EX. 8 | WATER-ABSORBENT POLYMER(6) | 4.5 | 400 | 90 | 82 |
|  | WATER ABSORBENT(3) | 1.3 | — | 90 | 82 |
| COM. EX. 1 | — | — | — | — | — |
| COM. EX. 2 | COM. WATER-ABSORBENT POLYMER(C-2) | 5.5 | 910 | 91 | 80 |
| COM. EX. 3 | COM. WATER ABSORBENT(C-3) | 1.2 | — | 91 | 80 |
| COM. EX. 4 | COM. WATER-ABSORBENT POLYMER(C-4) | 6.7 | 200 | 90 | 71 |

Abbreviation:

PDN. stands for PRODUCTION

COM. stands for COMPARATIVE

EX. stands for EXAMPLE

*After 7-day exposure to atmosphere of 70 ± 1° C. of temperature and 65 ± 1% of relative humidity.

**Polymerization proceeds too fast and its condition is unstable.

As shown in Table 1, the water-absorbent polymer or the water absorbent according to the present invention exhibits such a high L value of 75 or higher after being exposed. This proves that the water-absorbent polymer or the water absorbent according to the present invention well achieves white condition of particles, which gives clean impression. It can also be said that, from the fact that the white condition was achieved even with a drying temperature during the production process of as high as 180° C. (150° C. or higher), deterioration caused by breakage of main-chain in the polymer was prevented. Further, the water-absorbent polymer or the water absorbent according to the present invention exhibits preferred values of GVs. Furthermore, the water absorbents (1) to (3) have deterioration-induced extractable content in an amount of 12.0 or less; that is, a possibility of a gel becoming extractable is extremely low.

The present invention makes it possible to obtain an extremely high-quality water-absorbent polymer and water absorbent that improve in long-term color stability and in urine tolerance while maintaining an absorbing property. It can be said that this proves that the present invention is beneficial.

INDUSTRIAL APPLICABILITY

The present invention provides an excellent particulate water-absorbent polymer that achieves (i) long-term color stability and urine tolerance and (ii) absorbing property, which are in such a trade-off relationship. The present invention is applicable in a variety of fields such as sanitary materials such as disposable diapers and sanitary napkins; pet sheets; water stop materials; and the like.

The invention claimed is:

1. A particulate water-absorbent polymer obtained through a method comprising:
   polymerizing a monomer aqueous solution (B) containing (i) at least one of monomer (A) that is capable of forming a water-absorbent polymer by polymerization, (ii) at least one of crosslinking agent, (iii) at least of polymerization initiator and (iv) an organic phosphorous compound in an amount of not less than 1 ppm by mass but not more than 100 ppm by mass with respect to the monomer (A) so as to obtain a hydrogel polymer; and thermally drying the hydrogel polymer;
   the particulate water-absorbent polymer exhibiting an L value(Lightness) of 70 or higher in Hunter's Lab color system after 7-day exposure to atmosphere of 70±1° C. of temperature and 65±1% of relative humidity and comprising iron in an amount based on $Fe_2O_3$ of not less than 0.001 ppm by mass but not more than 5 ppm by mass with respect to the particulate water-absorbent polymer.

2. The particulate water-absorbent polymer according to claim 1, wherein the monomer solution (B) contains the organic phosphorous compound in amount of not less than 30 ppm by mass but not more than 100 ppm by mass with respect to the monomer (A).

3. The particulate water-absorbent polymer according to claim 1, wherein the at least one of monomer (A) contains not less than 70 mol % but not more than 100 mol % of acrylic acid and salt thereof, and the acrylic acid and salt thereof contain not less than 1 mol % but not more than 50 mol % of acrylic acid and not less than 50 mol % but not more than 99 mol % of an alkali metal salt of acrylic acid.

4. The particulate water-absorbent polymer according to claim 1, the method comprising surface-crosslinking the particulate water-absorbent polymer.

5. The particulate water-absorbent polymer according to claim 4, wherein the step of surface-crosslinking includes heating the particulate water-absorbent polymer at a heating temperature of not less than 150° C. but not more than 250° C.

6. The particulate water-absorbent polymer according to claim 1, the method comprising adding the organic phosphorous compound to the hydrogel polymer or to the particulate water-absorbent polymer, after the polymerization.

7. The particulate water-absorbent polymer according to claim 1, wherein moisture content of the particulate water-absorbent polymer is not more than 5 mass %.

8. The particulate water-absorbent polymer according to claim 1, wherein the hydrogel polymer is thermally dried at a heating temperature of not less than 170° C. but not more than 220° C.

9. The particulate water-absorbent polymer according to claim 1, wherein particles having a particle size of 150 to 600 μm is 60 to 100 mass % with respect to a total amount of the particulate water-absorbent polymer.

10. A particulate water-absorbent polymer obtained through a method comprising:
    polymerizing a monomer aqueous solution (B) containing (i) at least one of monomer (A) that is capable of forming a water-absorbent polymer by polymerization, (ii) at least one of crosslinking agent and (iii) at least one of polymerization initiator so as to obtain a hydrogel polymer; and
    thermally drying the hydrogel polymer,
    wherein the hydrogel polymer before the drying contains an organic phosphorous compound and iron in an amount based on $Fe_2O$ of not less than 0.001 ppm by mass but not more than 5 ppm by mass with respect to the particulate water-absorbent polymer,
    a drying temperature during the step of thermally drying is not less than 150° C. but not more than 250° C., and
    the particulate water-absorbent polymer contains the organic phosphorous compound in an amount of not less than 30 ppm by mass but not more than 500 ppm by mass with respect to the particulate water-absorbent polymer,
    the particulate water-absorbent polymer satisfying at least one of the followings (a) to (c):
    (a) a particle of the particulate water-absorbent polymer after 7-day exposure to atmosphere of 70±1° C. of temperature and 65±1% of relative humidity exhibits an L value (Lightness) of 70 or higher in Hunter's Lab color system;
    (b) the particulate water-absorbent polymer contains particles having a diameter of less than 150 μm in an amount of 0 or more mass % but not more than 5 mass %; a mass median particle size (D50) is not less than 200 μm but not more than 600 μm; and a logarithmic standard deviation (σζ) of a particle size distribution is not less than 0.20 but not more than 0.40; and
    (c) an absorbency against pressure (AAP) under pressure of 1.9 kPa or 4.8 kPa for 0.90 mass % sodium chloride aqueous solution for 60 minutes is at least 20 (g/g).

11. The particulate water-absorbent polymer according to claim 10, wherein the monomer solution (B) contains the organic phosphorous compound in amount of not less than 30 ppm by mass but not more than 100 ppm by mass with respect to the monomer (A).

12. The particulate water-absorbent polymer according to claim 10, wherein the at least one of monomer (A) contains not less than 70 mol % but not more than 100 mol % of acrylic acid and salt thereof, and the acrylic acid and salt thereof contain not less than 1 mol % but not more than 50 mol % of acrylic acid and not less than 50 mol % but not more than 99 mol % of an alkali metal salt of acrylic acid.

13. The particulate water-absorbent polymer according to claim 10, wherein the monomer aqueous solution (B) contains iron in an amount of not less than 0.001 ppm by mass but not more than 5 ppm by mass (based on $Fe_2O_3$) with respect to the monomer (A).

14. The particulate water-absorbent polymer according to claim 10, the method comprising surface-crosslinking the particulate water-absorbent polymer.

15. The particulate water-absorbent polymer according to claim 14, wherein the step of surface-crosslinking includes heating the particulate water-absorbent polymer at a heating temperature of not less than 150° C. but not more than 250° C.

16. The particulate water-absorbent polymer according to claim 10, the method comprising adding the organic phosphorous compound to the hydrogel polymer or to the particulate water-absorbent polymer, after the polymerization.

17. The particulate water-absorbent polymer according to claim 10, wherein moisture content of the particulate water-absorbent polymer is not more than 5 mass %.

18. The particulate water-absorbent polymer according to claim 10, wherein the hydrogel polymer is thermally dried at a heating temperature of not less than 170° C. but not more than 220° C.

19. The particulate water-absorbent polymer according to claim 10, wherein particles having a particle size of 150 to 600 μm is 60 to 100 mass % with respect to a total amount of the particulate water-absorbent polymer.

20. A particulate water-absorbent polymer obtained through a method comprising:
polymerizing a monomer aqueous solution (B) containing (i) at least one of monomer (A) that is capable of forming a water-absorbent polymer by polymerization, (ii) a least one of crosslinking agent, and (iii) at least one of polymerization initiator so as to obtain a hydrogel polymer; and thermally drying the hydrogel polymer, wherein the hydrogel
polymer before the drying contains an organic phosphorous compound, and a drying temperature during the step of thermally drying is not less than 150° C. but not more than 250° C.,
the particulate water-absorbent polymer exhibiting an L value (Lightness) of 70 or higher in Hunter's Lab color system after 7-day exposure to atmosphere of 70±1° C. of temperature and 65±1% of relative humidity and the particulate water-absorbent polymer further comprising iron in amount based on $Fe_2O_3$ of not less than 0.001 ppm by mass but not more than 5 ppm by mass with respect to the particulate water-absorbent polymer.

21. The particulate water-absorbent polymer according to claim 20, wherein particles having a particle size of 150 to 600 μm is 60 to 100 mass % with respect to a total amount of the particulate water-absorbent polymer.

22. A particulate water-absorbent polymer containing an organic phosphorous compound in an amount of not less than 30 ppm by mass but not more than 500 ppm by mass with respect to the particulate water-absorbent polymer, and iron in an amount based on $Fe_2O_3$ of not less than 0.001 ppm by mass but not more than 5 ppm by mass with respect to the particulate water-absorbent polymer, the particulate water-absorbent polymer satisfying at least one of the followings (a) to (c):
  (a) a particle of the particulate water-absorbent polymer after 7-day exposure to atmosphere of 70±1° C. of temperature and 65±1% of relative humidity exhibits an L value (Lightness) of 70 or higher in Hunter's Lab color system;
  (b) the particulate water-absorbent polymer contains particles having a diameter of less than 150 μm in an amount of 0 or more mass % but not more than 5 mass %; a mass median particle size (D50) is not less than 200 μm but not more than 600 μm; and a logarithmic standard deviation (σζ) of a particle size distribution is not less than 0.20 but not more than 0.40; and
  (c) an absorbency against pressure (AAP) under pressure of 1.9 kPa or 4.8 kPa for 0.90 mass % sodium chloride aqueous solution for 60 minutes is at least 20 (g/g).

23. The particulate water-absorbent polymer according to claim 22, wherein moisture content of the particulate water-absorbent polymer is not more than 5 mass %.

24. The particulate water-absorbent polymer according to claim 22, wherein particles having a particle size of 150 to 600 μm is 60 to 100 mass % with respect to a total amount of the particulate water-absorbent polymer.

* * * * *